US011669192B2

(12) United States Patent
Chae et al.

(10) Patent No.: US 11,669,192 B2
(45) Date of Patent: Jun. 6, 2023

(54) ELECTRONIC DEVICE FOR PROCESSING INPUT EVENT AND METHOD OF OPERATING SAME

(71) Applicant: Samsung Electronics Co., Ltd., Suwon-si (KR)

(72) Inventors: Iljoo Chae, Suwon-si (KR); Hyoungyoun Na, Suwon-si (KR); Seungjae Han, Suwon-si (KR); Sungjun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/497,515

(22) Filed: Oct. 8, 2021

(65) Prior Publication Data

US 2022/0027009 A1 Jan. 27, 2022

Related U.S. Application Data

(63) Continuation of application No. 16/524,705, filed on Jul. 29, 2019, now Pat. No. 11,144,154.

(30) Foreign Application Priority Data

Aug. 1, 2018 (KR) .......................... 10-2018-0089832

(51) Int. Cl.
*G06F 3/041* (2006.01)
*G06F 3/04883* (2022.01)

(52) U.S. Cl.
CPC ........ *G06F 3/0416* (2013.01); *G06F 3/04883* (2013.01)

(58) Field of Classification Search
CPC .............. G06F 3/0416; G06F 3/04883; G06F 3/04166; G06F 3/0412; G06F 2203/04104
See application file for complete search history.

(56) References Cited

U.S. PATENT DOCUMENTS 7,133,031 B2 * 11/2006 Wang .................. G06F 3/03545
345/173
7,453,439 B1 * 11/2008 Kushler .............. G06F 3/04883
345/173

(Continued)

FOREIGN PATENT DOCUMENTS

CN 104679469 A * 6/2015 ............. G06F 3/038
KR 10-0810218 B1 3/2008
(Continued)

OTHER PUBLICATIONS

International Search Report dated Nov. 21, 2019, issued in International Patent Application No. PCT/KR2019/009433.

(Continued)

*Primary Examiner* — Benyam Ketema
(74) *Attorney, Agent, or Firm* — Jefferson IP Law, LLP

(57) ABSTRACT

An electronic device and a method of operating the same for processing a plurality of touch input events made on a touch-screen display are provided. The electronic device includes a touch-screen display, configured to transfer data on one or more touch events to a processor on the basis of a first period and the processor, configured to acquire resampling data on the basis of a second period, which has an integer-multiple relationship with the first period, using the received data, wherein the processor is configured to identify movement speeds related to the touch events using the received data, determine a resampling time at which the resampling data is acquired on the basis of the identified movement speeds, and acquire the resampling data on the basis of the determined resampling time.

11 Claims, 15 Drawing Sheets

(56) References Cited

U.S. PATENT DOCUMENTS

| | | | |
|---|---|---|---|
| 10,152,218 B2* | 12/2018 | Ugawa | H04N 23/635 |
| 10,268,308 B2 | 4/2019 | Lee et al. | |
| 2003/0206162 A1* | 11/2003 | Roberts | G06F 3/04142 |
| | | | 345/173 |
| 2008/0042985 A1* | 2/2008 | Katsuhito | G06F 3/0446 |
| | | | 345/173 |
| 2009/0267904 A1* | 10/2009 | Mak-Fan | G06F 3/0416 |
| | | | 345/173 |
| 2009/0289905 A1* | 11/2009 | Ahn | G06F 3/04883 |
| | | | 345/173 |
| 2010/0053107 A1* | 3/2010 | Tsuzaki | G06F 3/047 |
| | | | 345/173 |
| 2010/0137031 A1* | 6/2010 | Griffin | G06F 3/0488 |
| | | | 345/173 |
| 2011/0043527 A1* | 2/2011 | Ording | G06F 3/04845 |
| | | | 345/428 |
| 2013/0181908 A1* | 7/2013 | Santiago | G06F 3/0488 |
| | | | 345/173 |
| 2015/0160774 A1* | 6/2015 | Zhai | G06F 3/04166 |
| | | | 345/173 |
| 2015/0242042 A1* | 8/2015 | Kuge | G06T 11/20 |
| | | | 345/178 |
| 2017/0131832 A1* | 5/2017 | Lee | G06F 3/0412 |
| 2018/0032174 A1 | 2/2018 | Lee et al. | |

FOREIGN PATENT DOCUMENTS

| | | |
|---|---|---|
| KR | 10-2010-0130060 A | 12/2010 |
| KR | 10-2017-0053533 A | 5/2017 |
| KR | 10-2018-0014622 A | 2/2018 |
| WO | 2017/193328 A1 | 11/2017 |
| WO | WO-2017193328 A1 * | 11/2017 |

OTHER PUBLICATIONS

Extended European Search Report dated Jun. 29, 2021, issued in European Patent Application No. 19845390.4.
European Office Action dated Apr. 29, 2022, issued in European Patent Application No. 19 845 390. 4.
Korean Office Action dated Sep. 21, 2022, issued in Korean Patent Application No. 10-2018-0089832.
Korean Notice of Patent Grant dated Feb. 14, 2023, issued in International Application No. 10-2018-0089832.

* cited by examiner

ELECTRONIC DEVICE FOR PROCESSING INPUT EVENT AND METHOD OF OPERATING SAME

CROSS-REFERENCE TO RELATED APPLICATION(S)

This application is a continuation application of prior application Ser. No. 16/524,705, filed on Jul. 29, 2019, which application is based on and claims priority under 35 U.S.C. § 119(a) of a Korean patent application number 10-2018-0089832, filed on Aug. 1, 2018, in the Korean Intellectual Property Office, the disclosure of which is incorporated by reference herein in its entirety.

BACKGROUND

1. Field

The disclosure relates to an electronic device for processing a plurality of touch input events input into a touch-screen display and a method of operating the same.

2. Description of Related Art

An electronic device such as a smartphone may provide a user with complex services of playing a game, using a messenger, editing a document, drawing a picture, and reproducing and editing an image/video, in addition to basic services of making a phone call and sending a message. A portable electronic device may include a touch-screen display for displaying content and receiving a touch input in order to provide a user with various services. The user may make a touch input on the touch-screen display through various input means such as a body part or a digitizer pen. The user may make a touch input including a plurality of touch events on the touch-screen display. For example, the user may make a touch input including a plurality of touch events such as a drag on the touch-screen display.

The above information is presented as background information only to assist with an understanding of the disclosure. No determination has been made, and no assertion is made, as to whether any of the above might be applicable as prior art with regard to the disclosure.

SUMMARY

A touch-screen display transfers information on a plurality of touch events input into the touch-screen display to a processor, and the processor processes the transferred information on the plurality of touch events in a form suitable for use by an application. For example, the processor may perform resampling according to a predetermined period on the basis of the received information on the touch events.

However, the touch-screen display having various types of input means and various specifications transfers the information on the touch events to the processor according to various periods, and thus the processor is required to perform a resampling operation appropriately according to the relationship between a resampling period and an information transfer period of the touch-screen display.

Further, the processor is required to perform a resampling operation appropriately according to the characteristics of the touch input made on the touch-screen display.

Aspects of the disclosure are to address at least the above-mentioned problems and/or disadvantages and to provide at least the advantages described below. Accordingly, an aspect of the disclosure is to provide an apparatus and method for processing a touch input made on a touch-screen display to be suitable for a user's intention and a situation by performing a resampling operation through a predetermined method according to whether an information transfer period in which the touch-screen display transfers information on the touch event to the processor and a resampling period of a processor have an integer-multiple relationship therebetween.

Additional aspects will be set forth in part in the description which follows and, in part, will be apparent from the description, or may be learned by practice of the presented embodiments.

In accordance with an aspect of the disclosure, an electronic device is provided. The electronic device includes a touch-screen display, configured to transfer data on touch events to a processor, based on a first period and the processor, configured to acquire resampling data based on a second period, which has an integer-multiple relationship with the first period, using the received data, wherein the processor is configured to identify movement speeds related to the touch events using the received data, determine a resampling time at which the resampling data is acquired based on the identified movement speeds, and acquire the resampling data based on the determined resampling time.

In accordance with another aspect of the disclosure, an electronic device is provided. The electronic device includes a touch-screen display configured to transfer data on touch events to a processor, based on a first period and the processor, configured to acquire resampling data, based on a second period, using the received data, the second period not corresponding to an integer multiple of the first period, wherein the processor is configured to identify that data on a first touch event, scheduled to be transmitted at a first time, is transmitted at a second time, correct the data on the first touch event in accordance with the first time, and acquire the resampling data using the corrected data on the first touch event.

Through an electronic device and a method of operating the same according to various embodiments of the disclosure, it is possible to process data on a touch input for an optimal operation according to a user's intention by considering the relationship between an information transfer period from the touch-screen display and a resampling period of the processor and the characteristics of the touch input.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
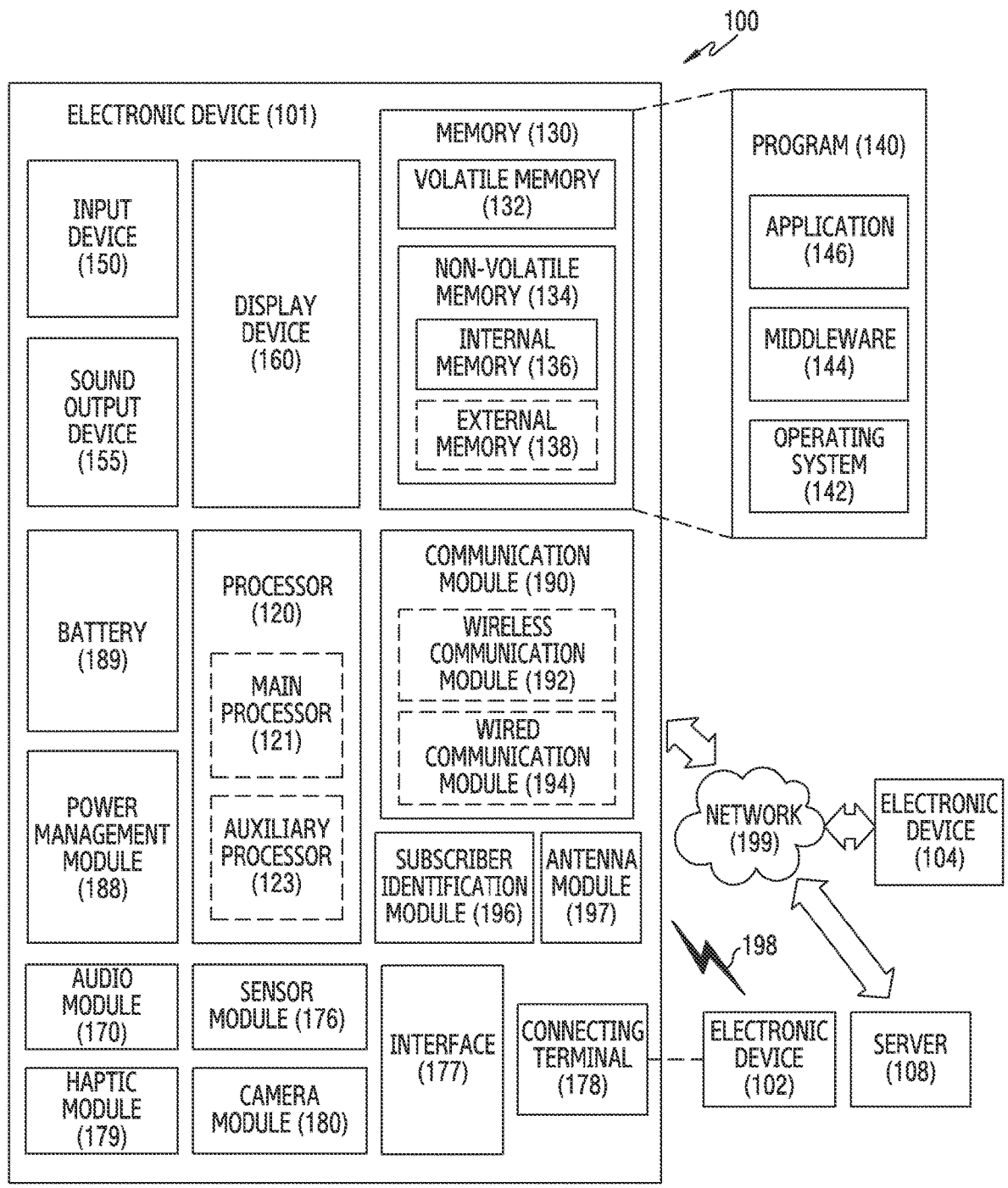
FIG. 1 illustrates a network environment according to an embodiment of the disclosure.

FIG. 1 is a block diagram illustrating an electronic device (101) in a network environment (100) according to an embodiment of the disclosure.

Referring to FIG. 1, the electronic device (101) in the network environment (100) may communicate with an electronic device (102) via a first network (198) (e.g., a short-range wireless communication network), or an electronic device (104) or a server (108) via a second network (199) (e.g., a long-range wireless communication network). According to an embodiment, the electronic device (101) may communicate with the electronic device (104) via the server (108). According to an embodiment, the electronic device (101) may include a processor (120), memory (130), an input device (150), a sound output device (155), a display device (160), an audio module (170), a sensor module (176), an interface (177), a haptic module (179), a camera module (180), a power management module (188), a battery (189), a communication module (190), a subscriber identification module (SIM) (196), or an antenna module (197). In some embodiments, at least one (e.g., the display device (160) or the camera module (180)) of the components may be omitted from the electronic device (101), or one or more other components may be added in the electronic device (101). In some embodiments, some of the components may be implemented as single integrated circuitry. For example, the sensor module (176) (e.g., a fingerprint sensor, an iris sensor, or an illuminance sensor) may be implemented as embedded in the display device (160) (e.g., a display).

The processor (120) may execute, for example, software (e.g., a program (140)) to control at least one other component (e.g., a hardware or software component) of the electronic device (101) coupled with the processor (120), and may perform various data processing or computation. According to one embodiment, as at least part of the data processing or computation, the processor (120) may load a command or data received from another component (e.g., the sensor module (176) or the communication module (190)) in volatile memory (132), process the command or the data stored in the volatile memory (132), and store resulting data in non-volatile memory (134). According to an embodiment, the processor (120) may include a main processor (121) (e.g., a central processing unit (CPU) or an application processor (AP)), and an auxiliary processor (123) (e.g., a graphics processing unit (GPU), an image signal processor (ISP), a sensor hub processor, or a communication processor (CP)) that is operable independently from, or in conjunction with, the main processor (121). Additionally or alternatively, the auxiliary processor (123) may be adapted to consume less power than the main processor (121), or to be specific to a specified function. The auxiliary processor (123) may be implemented as separate from, or as part of the main processor (121).

The auxiliary processor (123) may control at least some of functions or states related to at least one component (e.g., the display device (160), the sensor module (176), or the communication module (190)) among the components of the electronic device (101), instead of the main processor (121) while the main processor (121) is in an inactive (e.g., sleep) state, or together with the main processor (121) while the main processor (121) is in an active state (e.g., executing an application). According to an embodiment, the auxiliary processor (123) (e.g., an image signal processor or a communication processor) may be implemented as part of another component (e.g., the camera module (180) or the communication module (190)) functionally related to the auxiliary processor (123).

The memory (130) may store various data used by at least one component (e.g., the processor (120) or the sensor module (176)) of the electronic device (101). The various data may include, for example, software (e.g., the program (140)) and input data or output data for a command related thereto. The memory (130) may include the volatile memory (132) or the non-volatile memory (134).

The program (140) may be stored in the memory (130) as software, and may include, for example, an operating system (OS) (142), middleware (144), or an application (146).

The input device (150) may receive a command or data to be used by other component (e.g., the processor (120)) of the electronic device (101), from the outside (e.g., a user) of the electronic device (101). The input device (150) may include, for example, a microphone, a mouse, a keyboard, or a digital pen (e.g., a stylus pen).

The sound output device (155) may output sound signals to the outside of the electronic device (101). The sound output device (155) may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device (160) may visually provide information to the outside (e.g., a user) of the electronic device (101). The display device (160) may include, for example, a display, a hologram device, or a projector and control circuitry to control a corresponding one of the display, hologram device, and projector. According to an embodiment, the display device (160) may include touch circuitry adapted to detect a touch, or sensor circuitry (e.g., a pressure sensor) adapted to measure the intensity of force incurred by the touch.

The audio module (170) may convert a sound into an electrical signal and vice versa. According to an embodiment, the audio module (170) may obtain the sound via the input device (150), or output the sound via the sound output device (155) or a headphone of an external electronic device (e.g., an electronic device (102)) directly (e.g., wiredly) or wirelessly coupled with the electronic device (101).

The sensor module (176) may detect an operational state (e.g., power or temperature) of the electronic device (101) or an environmental state (e.g., a state of a user) external to the electronic device (101), and then generate an electrical signal or data value corresponding to the detected state. According to an embodiment, the sensor module (176) may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface (177) may support one or more specified protocols to be used for the electronic device (101) to be coupled with the external electronic device (e.g., the electronic device (102)) directly (e.g., wiredly) or wirelessly. According to an embodiment, the interface (177) may include, for example, a high definition multimedia interface (HDMI), a universal serial bus (USB) interface, a secure digital (SD) card interface, or an audio interface.

A connecting terminal (178) may include a connector via which the electronic device (101) may be physically connected with the external electronic device (e.g., the electronic device (102)). According to an embodiment, the connecting terminal (178) may include, for example, a HDMI connector, a USB connector, a SD card connector, or an audio connector (e.g., a headphone connector).

The haptic module (179) may convert an electrical signal into a mechanical stimulus (e.g., a vibration or a movement) or electrical stimulus which may be recognized by a user via his tactile sensation or kinesthetic sensation. According to an embodiment, the haptic module (179) may include, for example, a motor, a piezoelectric element, or an electric stimulator.

The camera module (180) may capture a still image or moving images. According to an embodiment, the camera module (180) may include one or more lenses, image sensors, image signal processors, or flashes.

The power management module (188) may manage power supplied to the electronic device (101). According to one embodiment, the power management module (188) may be implemented as at least part of, for example, a power management integrated circuit (PMIC).

The battery (189) may supply power to at least one component of the electronic device (101). According to an embodiment, the battery (189) may include, for example, a primary cell which is not rechargeable, a secondary cell which is rechargeable, or a fuel cell.

The communication module (190) may support establishing a direct (e.g., wired) communication channel or a wireless communication channel between the electronic device (101) and the external electronic device (e.g., the electronic device (102), the electronic device (104), or the server (108)) and performing communication via the established communication channel. The communication module (190) may include one or more communication processors that are operable independently from the processor (120) (e.g., the application processor (AP)) and supports a direct (e.g., wired) communication or a wireless communication. According to an embodiment, the communication module (190) may include a wireless communication module (192) (e.g., a cellular communication module, a short-range wireless communication module, or a global navigation satellite system (GNSS) communication module) or a wired communication module (194) (e.g., a local area network (LAN) communication module or a power line communication (PLC) module). A corresponding one of these communication modules may communicate with the external electronic device via the first network (198) (e.g., a short-range communication network, such as Bluetooth™ wireless-fidelity (Wi-Fi) direct, or infrared data association (IrDA)) or the second network (199) (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module (192) may identify and authenticate the electronic device (101) in a communication network, such as the first network (198) or the second network (199), using subscriber information (e.g., international mobile subscriber identity (IMSI)) stored in the SIM (196).

The antenna module (197) may transmit or receive a signal or power to or from the outside (e.g., the external electronic device) of the electronic device (101). According to an embodiment, the antenna module (197) may include a plurality of antennas. In such a case, at least one antenna appropriate for a communication scheme used in the communication network, such as the first network (198) or the second network (199), may be selected, for example, by the communication module (190) (e.g., the wireless communication module (192)) from the plurality of antennas. The signal or the power may then be transmitted or received between the communication module (190) and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device (101) and the external electronic device (104) via the server (108) coupled with the second network (199). Each of the electronic devices (102) and (104) may be a device of a same type as, or a different type, from the electronic device (101). According to an embodiment, all or some of operations to be executed at the electronic device (101) may be executed at one or more of the external electronic devices (102), (104), or (108). For example, if the electronic device (101) should perform a function or a service automatically, or in response to a request from a user or another device, the electronic device (101), instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device (101). The electronic device (101) may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program (140)) including one or more instructions that are stored in a storage medium (e.g., internal memory (136) or external memory (138)) that is readable by a machine (e.g., the electronic device (101)). For example, a processor (e.g., the processor (120)) of the machine (e.g., the electronic device (101)) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
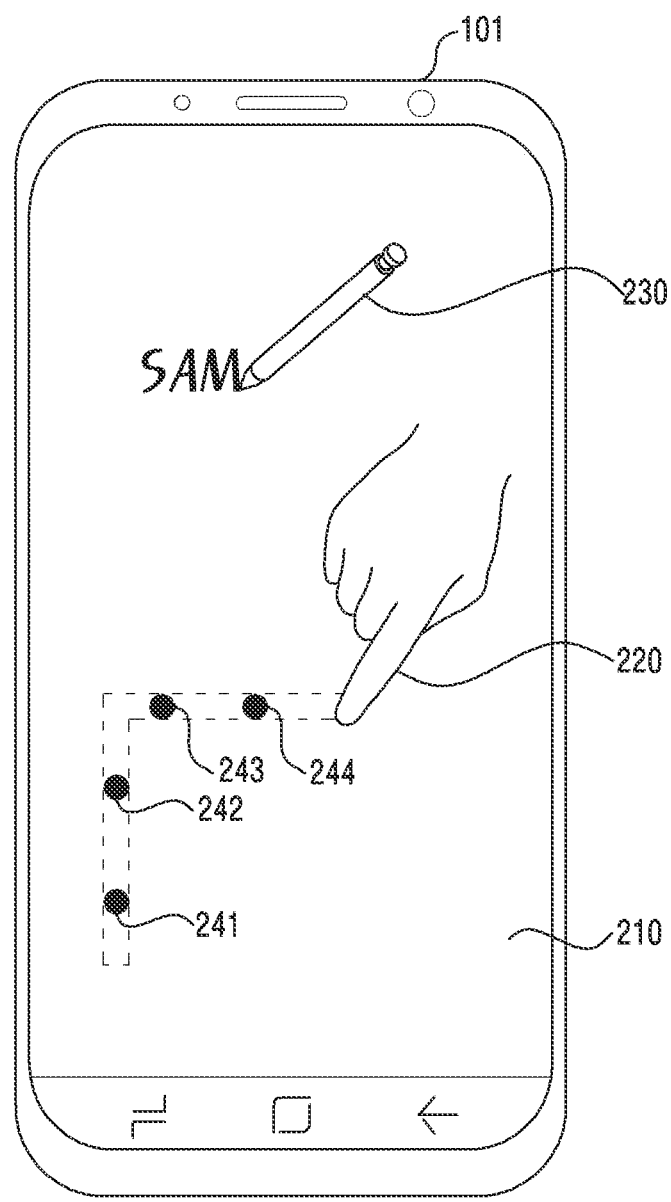
FIG. 2 illustrates the appearance of an electronic device according to an embodiment of the disclosure.

FIG. 2 illustrates the appearance of the electronic device according to an embodiment of the disclosure.

Referring to FIG. 2, the electronic device 101 may include a touch-screen display 210. The touch-screen display 210 may display content and receive a touch input from a user. For example, the touch-screen display 210 may receive the touch input from the user through a user's body part (for example, a finger 220) or a digitizer pen 230.

According to an embodiment, the touch input received from the user may include at least one of a first touch event 241, a second touch event 242, a third touch event 243, and/or a fourth touch event 244. One touch event may correspond to a specific time and a specific location. For example, the first touch event 241 may be a touch event input into a first location at a first time, and the second touch event 242 may be a touch event input into a second location at a second time. At least one of the input time and the input location of the second touch event 242 may be actually different from that of the first touch event 241.

According to an embodiment, the touch-screen display 210 may receive a touch input including a single touch event, like a tap input. In another example, the touch-screen display 210 may receive a touch input including a plurality of discontinuous touch events, like a multi-touch input. In another example, the touch-screen display 210 may receive a touch input including a plurality of continuous touch events, like a drag input.

According to an embodiment, the touch-screen display 210 may acquire information on one or more touch events. The information on the one or more touch events may include information on a location (or coordinates) at which each of the one or more touch events is generated and/or information on the time at which each of the one or more touch events is generated.

According to an embodiment, the touch-screen display 210 may acquire information on at least some of the one or more touch events. For example, the touch-screen display 210 may acquire information on a plurality of coordinates corresponding to at least some of the one or more touch events at predetermined (or regular) time intervals. In another example, the touch-screen display 210 may acquire information on a plurality of coordinates corresponding to at least some of the one or more touch events at irregular time intervals.

According to an embodiment, when the touch input includes a plurality of continuous touch events, like the drag input, the touch-screen display 210 may acquire information on some of the plurality of continuous touch events (for example, coordinate information of a first touch event 241 to a fourth touch event 244). Acquiring all of the information on the plurality of continuous touch events is burdensome from the aspects of data processing and current consumption, and thus the electronic device 101 may acquire only information on some of the touch events periodically or irregularly.

Figure 3:
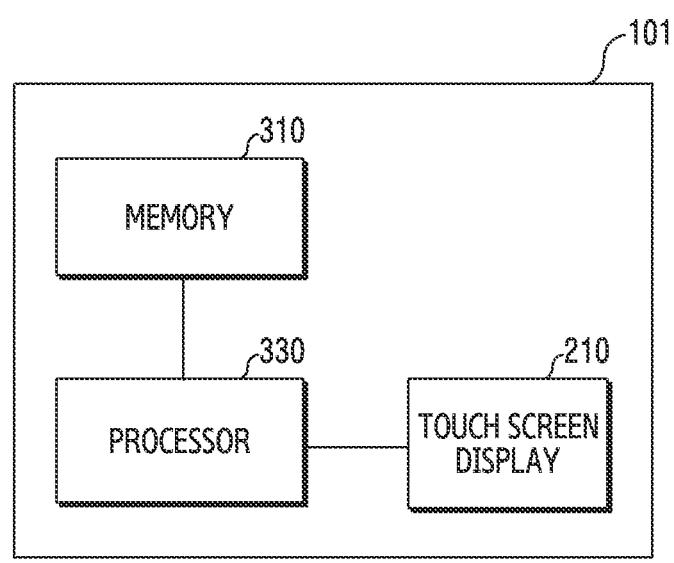
FIG. 3 is a block diagram illustrating the electronic device according to an embodiment of the disclosure.

FIG. 3 is a block diagram illustrating the electronic device according to an embodiment of the disclosure.

Referring to FIG. 3, the electronic device 101 according to various embodiments of the disclosure may include at least one of the touch-screen display 210, a memory 310, and/or a processor 330.

The touch-screen display 210 may output a screen. For example, the touch-screen display 210 may output an execution screen of at least one application executed in the electronic device 201. The touch-screen display 210 may include a display panel for outputting a screen. The touch-screen display 210 may receive a user input. For example, the touch-screen display 210 may detect a touch input by at least a user's body part. The touch-screen display 210 may additionally include a touch panel for detecting a touch input. In another example, the touch-screen display 210 may include a digitizer panel (or a digitizer module) for detecting a user input through an electronic pen or a digitizer.

The touch-screen display 210 may acquire information on one or more touch events included in the user input and transfer the acquired information on the one or more touch events to the processor 330. The information on the one or more touch events may include information on a location (or coordinates) at which each of the one or more events is generated and/or information on the time at which each thereof is generated. The touch-screen display 210 may include a touch-screen panel IC (TSP IC) (not shown), and the touch-screen panel IC may transfer information on one or more touch events (for example, raw data) to the processor 330 or a TSP driver (not shown) included in the processor 330.

The touch-screen display 210 may acquire information on one or more touch events and transfer the acquired information to the processor 330 according to a predetermined period (or at a predetermined rate). For example, the touch-screen display 210 may acquire and transfer the information on the one or more touch events according to a first period.

According to an embodiment, the information acquisition period or the information transfer period of the touch-screen display 210 may be changed according to the circumstances, or may be variously configured (or determined). For example, the information acquisition period or the information transfer period of the touch-screen display 210 may vary depending on the type of an input means (for example, a finger or a digitizer pen). In another example, the information acquisition period or the information transfer period of the touch-screen display 210 may vary depending on the hardware/software specifications of the touch-screen display 210.

The memory 310 may include volatile memory and/or nonvolatile memory. The memory 310 may be the memory 130 illustrated in FIG. 1. The memory 310 may store commands, data, one or more applications, or programs. For example, the memory 310 may store a program by which the processor 330 acquires resampling data on the basis of data on one or more touch events transferred from the touch-screen display 210. In another example, the memory 310 may store a program for identifying movement speeds related to the one or more touch events (or related to the touch input including the one or more touch events) on the basis of the data on the one or more touch events transferred from the touch-screen display 210 and determining a resampling time according to the identified movement speed.

The memory 310 may store an operating system of the electronic device 101 and store a framework included in the operating system.

The processor 330 may be electrically or operatively connected to the touch-screen display 210 and/or the memory 310. The processor 330 may control the touch-screen display 210 and/or the memory 310.

According to an embodiment, the processor 330 may receive information on one or more touch events from the touch-screen display 210. The processor 330 may receive information on one or more touch events from the touch-screen display 210 according to a predetermined period (for example, the first period) or irregularly. The information transfer period of the touch-screen display 210 may vary depending on the type of the input means, and thus the processor 330 may process the information on one or more touch events received from the touch-screen display 210 so as to be suitable for use by a currently executed application and then use the same. For example, the processor 330 may acquire resampling data according to a second period different from the first period on the basis of the information on the one or more touch events received from the touch-screen display 210 according to the first period and provide the acquired resampling data to at least one application being executed. Resampling may be an operation for re-controlling a time interval of data re-sampled according to a fixed period (or irregularly) and changing the value of the data according to the re-controlled time interval. For example, when the information transfer period (for example, the first period) corresponds to 90 Hz and the resampling period corresponds to 60 Hz, the processor 330 may receive information on one or more touch events from the touch-screen display 210 at every time interval of about 1.11 ms and acquire re-controlled resampling data at a time interval of 16.6 ms on the basis of the received information.

According to an embodiment, the resampling data may include information on a specific time and/or a specific location (or coordinates) or may correspond to a specific time and/or a specific location. The information on the one or more touch events, which is raw data of the resampling data, may include information on a time and a location (or coordinates), and the resampling operation may be an operation for re-controlling a time interval and changing only the value of the data according to the re-controlled time interval.

According to an embodiment, acquiring the resampling data according to the second period may mean that a time interval corresponding to each resampling data is the second period. In another embodiment, acquiring the resampling data according to the second period may mean that each resampling data is included in a time section (for example, frame) divided to have a predetermined interval and that the time section corresponds to the second period. For example, the resampling data may include first resampling data corresponding to 8.3 ms and second resampling data corresponding to 31 ms, the first resampling data may be included in a first frame (0 to 16.6 ms), and the second resampling data may be included in a second frame (16.6 ms to 33.2 ms). The time interval between the first resampling data and the second resampling data does not correspond to the second period, but in this case, the first resampling data and the second resampling data may be acquired according to the second period.

According to an embodiment, the processor 330 may change at least a portion of the resampling operation in consideration of the relationship between the information transfer period (for example, the first period) and the resampling period (for example, the second period). The processor 330 may or may not perform a specific operation according to whether the first period and the second period have an integer-multiple relationship therebetween (for example, the first period is 120 Hz and the second period is 60 Hz). For example, when the first period and the second period have an integer-multiple relationship therebetween, the processor 330 may identify movement speeds related to the touch events on the basis of the data on the touch events received from the touch-screen display 210. However, when the first period and the second period do not have an integer-multiple relationship therebetween, the processor 330 may omit the operation for identifying the movement speeds related to the touch events. In another example, when the first period and the second period do not have an integer-multiple relationship therebetween (for example, the first period is 90 Hz and the second period is 60 Hz), the processor 330 may determine whether data on the touch events is transferred later than an expected time. However, when the first period and the second period have an integer-multiple relationship therebetween, the processor 330 may omit the above-described operation. The reason why the resampling operation varies depending on whether the first period and the second period have an integer-multiple relationship will be described below in detail with reference to FIGS. 5 to 7.

Figure 4:
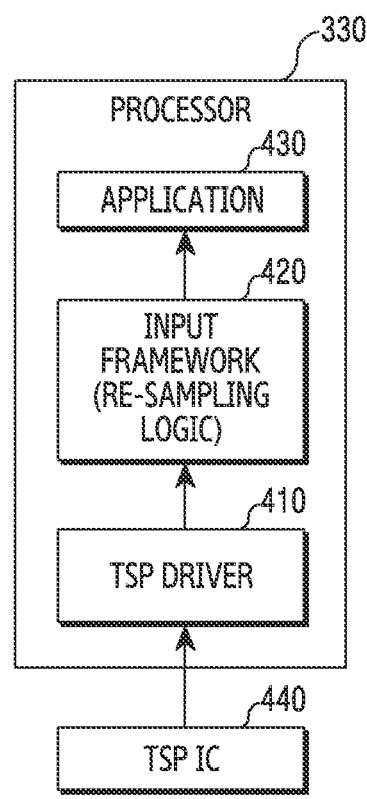
FIG. 4 illustrates data flow between a processor and a touch-screen display according to an embodiment of the disclosure.

FIG. 4 illustrates data flow between the processor and the touch-screen display according to an embodiment of the disclosure.

Referring to FIG. 4, the touch-screen display 210 may transfer information on one or more touch events to the processor 330. According to an embodiment, a touch-screen panel IC 440 included in the touch-screen display may transfer information (for example, raw data) on one or more touch events to a TSP driver 410 corresponding to a kernel layer of the processor 330.

The TSP driver 410 may transfer the information on the one or more touch events to an input framework 420 corresponding to a framework layer. The TSP driver 410 may transfer the information on the one or more touch events to the input framework 420 according to a predetermined period (for example, the first period).

The input framework 420 may be at least a portion of the framework for performing resampling logic. The input framework 420 may acquire resampling data by performing resampling according to a second period different from the information transfer period of the TSP driver 410 (for example, the first period). The input framework 420 may provide at least the acquired portion of the resampling data to at least one application 430 being executed by the processor 330. Although not illustrated, the processor 330 may include a first processor and a second processor, and an input framework included in the first processor may provide resampling data to at least one application being executed by the second processor.

The application 430 may perform at least one function on the basis of the information received from the input framework 420. For example, a screen lock application may release a lock mode on the basis of the information received from the input framework 420.

An electronic device (for example, the electronic device 101) according to various embodiments of the disclosure may include a touch-screen display (for example, the touch-screen display 210) configured to transfer data on one or more touch events to a processor (for example, the processor 330) on the basis of a first period (for example, the first period 610), and the processor configured to acquire resampling data on the basis of a second period (for example, the second period 620), which is an integer multiple of the first period, using the received data, wherein the processor may be configured to identify movement speeds related to the touch events using the received data, determine a resampling time (for example, the resampling time 626) at which the resampling data is acquired based on the identified movement speeds, and acquire the resampling data based on the determined resampling time.

According to various embodiments, the touch events may include a first touch event and a second touch event, generated later than the first touch event, and the data on the touch events may include data on coordinates and times at which the first touch event and the second touch event are generated.

According to various embodiments, the resampling time may be included in a time section having a predetermined length (for example, the first frame 640), to which the time at which the data on the first touch event is transmitted (for example, the first touch event transfer time 621) and the time at which the data on the second touch event is transmitted (for example, the second touch event transfer time 622) belong, and the resampling data may function as data representing the time section.

According to various embodiments, the processor may be configured to acquire the resampling data by interpolating or extrapolating the coordinates at which the first touch event is generated (for example, the coordinates 631 corresponding to the first touch event), and the coordinates at which the second touch event is generated (for example, the coordinates 632 corresponding to the second touch event), in accordance with the resampling time.

According to various embodiments, the processor may be configured to determine that the resampling time is the time at which the second touch event is transmitted when the identified movement speed is within a first range, and determine that the resampling time is an intermediate time between the time at which the first touch event is transmitted and the time at which the second touch event is transmitted when the identified movement speed is within a second range.

According to various embodiments, when the identified movement speed is within a third range, the processor may be configured to determine that the resampling time is a time located between the time at which the first touch event is transmitted and the time at which the second touch event is transmitted, and the relative position of the determined time between the time at which the first touch event is transmitted and the time at which the second touch event is transmitted corresponds to the relative position of the identified movement speed in the third range.

According to various embodiments, when the identified movement speed satisfies a predetermined condition while the resampling data is acquired by repeatedly performing only an extrapolation operation, the processor may be configured to control the resampling time such that the resampling data is acquired based on an interpolation method.

According to various embodiments, the movement speed may include a first movement speed corresponding to a first time section and a second movement speed corresponding to a second time section after the first time section, and in the predetermined condition, the first movement speed may be larger than or equal to a predetermined first value and the second movement speed may be equal to or smaller than a predetermined second value.

An electronic device (for example, the electronic device 101) according to various embodiments of the disclosure may include a touch-screen display (for example, the touch-screen display 210) configured to transfer data on touch events to a processor (for example, the processor 330) on the basis of a first period (for example, the first period 510); and the processor configured to acquire resampling data on the basis of a second period (for example, the second period 520) using the received data, the second period not corresponding to an integer multiple of the first period, wherein the processor may be configured to identify that data on a first touch event, scheduled to be transmitted at a first time (for example, an original transfer time), is transmitted at a second time (for example, a delayed time), correct the data on the first touch event in accordance with the first time, and acquire the resampling data using the corrected data on the first touch event.

According to various embodiments, the second touch event may be a touch event transferred to the processor at a time earlier than the first time, and the processor may be configured to acquire the resampling data by interpolating or extrapolating the coordinates at which the second touch event is generated and the coordinates corresponding to the corrected first touch event.

Figure 5:
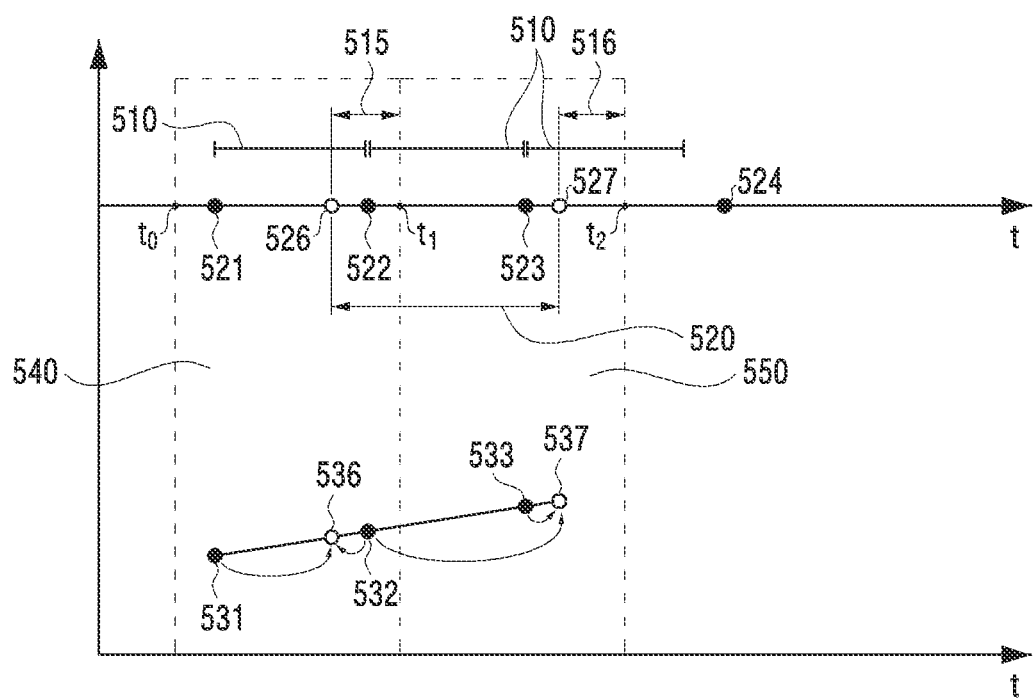
FIG. 5 illustrates a resampling operation performed on the basis of an interpolation method and an extrapolation method when the information transfer period and the resampling period do not have an integer-multiple relationship therebetween according to an embodiment of the disclosure.

FIG. 5 illustrates a resampling operation performed on the basis of an interpolation method and an extrapolation method when the information transfer period and the resampling period do not have an integer-multiple relationship therebetween according to an embodiment of the disclosure.

Referring to FIG. 5, information on one or more touch events is expressed on a time axis and information on one or more touch events may be expressed on a time-coordinate axis. A coordinate axis on the time-coordinate axis may indicate a movement distance value in a predetermined direction that can be implemented by a two-dimensional touch-screen display, such as an x direction or a y direction.

According to an embodiment, information on one or more touch events expressed on the time axis or the time-coordinate axis may include two types of information. For example, information received from the touch-screen display 210 according to a predetermined information transfer period (for example, a first period 510) is indicated by black circles. For example, the information received from the touch-screen display 210 may include information on a first touch event and/or information on a second touch event, and the information on the first touch event may include information on a time corresponding to the first touch event (for example, the time at which the first touch event is generated or a time determined by adding a predetermined time to the time at which the first touch event is generated) and/or information on a location (for example, coordinates) at which the first touch event is generated.

Referring to FIG. 5, the processor 330 may identify information on a first touch event transfer time 521, a second touch event transfer time 522, a third touch event transfer time 523, and/or a fourth touch event transfer time 524. The first touch event transfer time 521 may be the time at which information on the first touch event is transferred from the touch-screen display 210 to the processor 330.

In another example, the processor 330 may receive information on coordinates 531 corresponding to the first touch event, coordinates 532 corresponding to the second touch event, and/or coordinates 533 corresponding to the third touch event from the touch-screen display 210 according to the first period. In FIG. 5, the first period may correspond to, for example, 90 Hz.

In another example, the processor 330 may acquire resampling data according to a predetermined resampling period (for example, a second period 520). The resampling data acquired according to the predetermined resampling period is indicated by empty circles. Referring to FIG. 5, the processor 330 may acquire resampling data on the basis of information on the first to fourth touch event transfer times 521 to 524. For example, the processor 330 may acquire first resampling data and/or second resampling data. The processor 330 may acquire information on a resampling time 526 of the first resampling data and/or a resampling time 527 of the second resampling data. In FIG. 5, the second period may correspond to, for example, 60 Hz.

The processor 330 may acquire information on coordinates 536 corresponding to the first resampling data and coordinates 537 corresponding to the second resampling data.

Hereinafter, a method of acquiring information on the resampling times 526 and 527 of the first resampling data and the second resampling data and the information on the coordinates 536 and 537 corresponding to the first resampling data and the second resampling data will be described.

According to an embodiment, the resampling data may be included in respective time sections (for example, frames) divided to have a predetermined interval. For example, the first resampling data may be included in a first frame 540, and the second resampling data may be included in a second frame 550. Each piece of the resampling data may function as data that represents a frame included in each piece of the resampling data.

According to an embodiment, information on a resampling time of resampling data included in a specific frame may be determined regardless of information on transfer times of one or more touch events belonging to the specific frame. The resampling time 526 of the first resampling data belonging to the first frame 540 may be determined on the basis of a start time to and/or an end time $t_1$ of the first frame 540. For example, the resampling time 526 of the first resampling data may be generated by subtracting a first predetermined time 515 from the end time $t_1$ of the first frame 540. The resampling time 527 of the second resampling data may generated by subtracting a second predetermined time 516 from an end time $t_2$ of the second frame 550. The first predetermined time 515 may be different from the second predetermined time 516.

In another example, the resampling time 526 of the first resampling data may be a time determined by adding a predetermined time and the start time to of the first frame 540.

According to an embodiment, information on coordinates of resampling data belonging to a specific frame may be determined on the basis of information on coordinates of one or more touch events belonging to the specific frame. For example, coordinates 536 corresponding to the first resampling data belonging to the first frame 540 may be determined on the basis of coordinates 531 corresponding to the first touch event belonging to the first frame 540 and coordinates 532 corresponding to the second touch event. For example, the coordinates 536 corresponding to the first resampling data belonging to the first frame 540 may be determined by interpolating the coordinates 531 corresponding to the first touch event belonging to the first frame 540 and the coordinates 532 corresponding to the second event at a predetermined ratio. According to an embodiment, the predetermined ratio may be determined according to a time interval between the first touch event transfer time 521 and the resampling time 526 of the first resampling data and a time interval between the resampling time 526 of the first resampling data and the second touch event transfer time 522. For example, when the time interval between the first touch event transfer time 521 and the resampling time 526 of the first resampling data is 10 ms and the time interval between the resampling time 526 of the first resampling data and the second touch event transfer time 522 is 2 ms, the coordinates 536 corresponding to the first resampling data may be determined by interpolating the coordinates 531 corresponding to the first touch event and the coordinates 532 corresponding to the second touch event at a ratio of 5:1.

According to another embodiment, information on coordinates of resampling data belonging to a specific frame may be determined on the basis of information on one or more touch events belonging to the specific frame and a frame preceding the specific frame. For example, the coordinates 537 corresponding to the second resampling data belonging to the second frame 550 may be determined on the basis of the coordinates 533 corresponding to the third touch event belonging to the second frame 550 and the coordinates 532 corresponding to the second touch event belonging to the first frame 540. For example, the coordinates 537 corresponding to the second resampling data belonging to the second frame 550 may be determined by extrapolating the coordinates 532 corresponding to the second touch event belonging to the first frame 540 and the coordinates 533 corresponding to the third touch event belonging to the second frame 550 at a predetermined ratio. According to an embodiment, the predetermined ratio may be determined according to a time interval between the second touch event transfer time 522 and the resampling time 527 of the second resampling data and a time interval between the third touch event transfer time 523 and the resampling time 527 of the second resampling data.

According to an embodiment, resampling data that represents a specific frame (for example, the first frame 540) may be determined on the basis of information on one or more touch events (for example, the first touch event and the second touch event) belonging to one or more frames including the specific frame based on the resampling time (for example, the resampling time 526 of the first resampling data). According to another embodiment, the method of determining resampling data may vary depending on whether information on one or more touch events is transferred from the touch-screen display 210 between the resampling time (for example, the resampling time 526 of the first resampling data) and the time $t_1$ at which the specific frame (for example, the first frame 540) ends. For example, since information on the second touch event is transferred from the touch-screen display 210 between the resampling time 526 of the first resampling data and the time $t_1$ at which the first frame 540 ends, the coordinates 536 corresponding to the first resampling data may be determined on the basis of the interpolation method. In another example, since no information on touch events is transferred from the touch-screen display 210 between the resampling time 527 of the first resampling data and the time $t_2$ at which the second frame 550 ends, the coordinates 537 corresponding to the second resampling data may be determined on the basis of the extrapolation method. Although not illustrated, coordinates corresponding to resampling data may be determined based on whether information on one or more touch events is transmitted between the resampling time and the frame start time rather than on whether information on one or more touch events is transmitted between the resampling time and the frame end time.

As illustrated in FIG. 5, when the information transfer period (for example, the first period 510) of the touch-screen display 210 and the resampling period (for example, the second period 520) of the processor 330 do not have an integer-multiple relationship therebetween, the number of touch events that can be identified within a specific frame is not fixed. For example, information on two touch events may be transferred from the touch-screen display 210 in the first frame 540, and information on one touch event may be transferred from the touch-screen display 210 in the second frame 550. The processor 330 may use different methods of determining the coordinates corresponding to the resampling data according to the number of touch events identified within the specific frame. For example, as illustrated in FIG. 5, the processor 330 may alternately use the interpolation method in the first frame 540 and the extrapolation method in the second frame 550.

Figure 6:
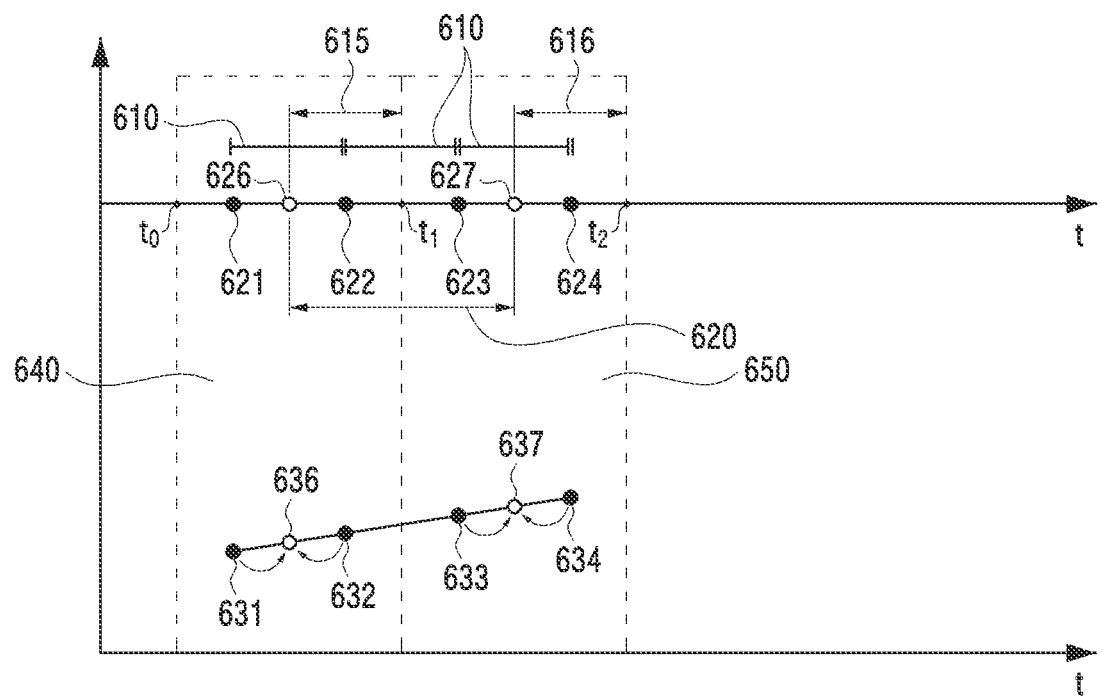
FIG. 6 illustrates a resampling operation performed on the basis of the interpolation method when the information transfer period and the resampling period have an integer-multiple relationship therebetween according to an embodiment of the disclosure.

FIG. 6 illustrates a resampling operation performed on the basis of the interpolation method when the information transfer period and the resampling period have an integer-multiple relationship therebetween according to an embodiment of the disclosure.

Referring to FIG. 6, the processor 330 may identify information on a first touch event transfer time 621, a second touch event transfer time 622, a third touch event transfer time 623, and/or a fourth touch event transfer time 624.

In another example, the processor 330 may receive coordinates 631 corresponding to the first touch event, coordinates 632 corresponding to the second touch event, coordinates 633 corresponding to the third touch event, and/or coordinates 634 corresponding to the fourth touch event from the touch-screen display 210 according to a first period. In FIG. 6, the first period may be, for example, 120 Hz.

In another example, the processor 330 may acquire resampling data according to a predetermined resampling period (for example, a second period). The processor 330 may acquire first resampling data of a first frame 640 and/or second resampling data of a second frame 650. For example, the processor 330 may acquire information on a resampling time 626 of the first resampling data and a resampling time 627 of the second resampling data. For example, the resampling time of the first resampling data may be a time 626 generated by subtracting a first predetermined time 615 from an end time $t_1$ of the first frame 640. In FIG. 6, the second period may be, for example, 60 Hz. The resampling time 627 of the second resampling data may generated by a subtracting a second predetermined time 616 from an end time $t_2$ of the second frame 650. The first predetermined time 615 may be different from the second predetermined time 616.

According to an embodiment, the processor 330 may determine information on coordinates of resampling data in the same or a consistent method (for example, the interpolation method) in a plurality of frames including the first frame 640 and the second frame 650. For example, the processor 330 may determine the coordinates 636 of the first resampling data, which represents the first frame 640, on the basis of the coordinates 631 corresponding to the first touch event and the coordinates 632 corresponding to the second touch event. For example, the processor 330 may determine the coordinates 636 of the first resampling data by interpolating the coordinates 631 corresponding to the first touch event and the coordinates 632 corresponding to the second touch event at a predetermined ratio. According to an embodiment, the predetermined ratio may be determined according to a time interval between the first touch event transfer time 621 and the resampling time 626 of the first resampling data and a time interval between the resampling time 626 of the first resampling data and the second touch event transfer time 622.

In another example, the processor 330 may determine the coordinates 637 of the second resampling data that represents the second frame 650 by interpolating the coordinates 633 corresponding to the third touch event and/or the coordinates 634 corresponding to the fourth touch event at a predetermined ratio.

In FIG. 6, the coordinates 636 of the first resampling data that represents the first frame 640 may be determined by the interpolation method, the coordinates 637 of the second resampling data that represents the second frame 650 may also be determined by the interpolation method, and frames subsequent to the second frame 650 may be determined by the same method.

Figure 7:
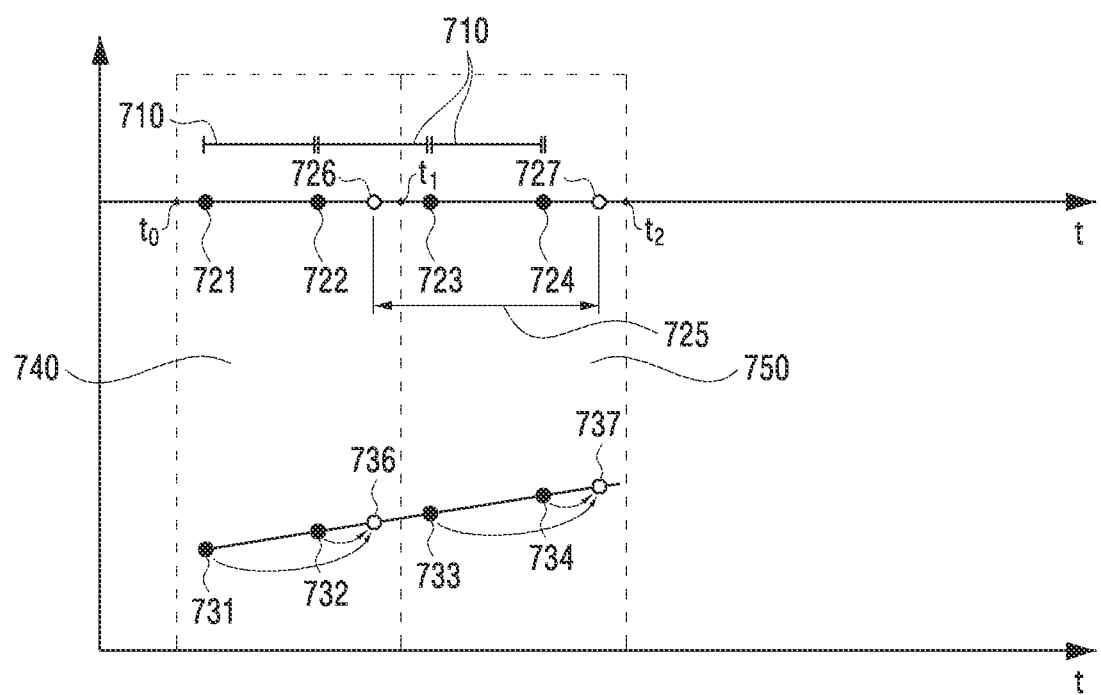
FIG. 7 illustrates a resampling operation performed on the basis of the extrapolation method when the information transfer period and the resampling period have an integer-multiple relationship therebetween according to an embodiment of the disclosure.

FIG. 7 illustrates a resampling operation performed on the basis of the extrapolation method when the information transfer period and the resampling period have an integer-multiple relationship therebetween according to an embodiment of the disclosure.

Referring to FIG. 7, the processor 330 may identify information on a first touch event transfer time 721, a second touch event transfer time 722, a third touch event transfer time 723, and/or a fourth touch event transfer time 724.

In another example, the processor 330 may receive information on coordinates 731 corresponding to the first touch event, coordinates 732 corresponding to the second touch event, coordinates 733 corresponding to the third touch event, and/or coordinates 734 corresponding to the fourth touch event from the touch-screen display 210 on the basis of a first period 710. In FIG. 7, the first period may be, for example, 120 Hz.

In another example, the processor 330 may acquire resampling data on the basis of a predetermined resampling period (for example, a second period 725). The processor 330 may acquire first resampling data of a first frame 740 and/or second resampling data of a second frame 750. For example, the processor 330 may acquire information on a resampling time 726 of the first resampling data and a resampling time 727 of the second resampling data. In FIG. 7, the second period may be, for example, 60 Hz.

According to an embodiment, the processor 330 may determine information on coordinates of resampling data by the same or consistent method (for example, the interpolation method) in a plurality of frames including the first frame 740 and the second frame 750. For example, the processor 330 may determine the coordinates 736 of the first resampling data that represents the first frame 740 on the basis of the coordinates 731 corresponding to the first touch event and the coordinates 732 corresponding to the second touch event. For example, the processor 330 may determine the coordinates 736 of the first resampling data by extrapolating the coordinates 731 corresponding to the first touch event and the coordinates 732 corresponding to the second touch event at a predetermined ratio. According to an embodiment, the predetermined ratio may be determined according to a time interval between the first touch event transfer time 721 and the resampling time 726 of the first resampling data and a time interval between the resampling time 726 of the first resampling data and the second touch event transfer time 722.

According to an embodiment, when the coordinates of the first resampling data that represents the first frame is determined on the basis of the extrapolation method, the processor 330 may determine coordinates of resampling data in the remaining frames including the second frame by the extrapolation method. Referring to FIG. 7, when the coordinates 736 of the first resampling data that represents the first frame 740 is determined by the extrapolation method, the processor 330 may determine the coordinates 737 of second resampling data that represents the second frame 750 by the extrapolation method and also determine coordinates of resampling data in the remaining frames by the same method.

Unlike FIG. 5, the reason why coordinates of all resampling data can be determined by the same or a consistent method (for example, one of the interpolation method and the extrapolation method) in FIG. 6 or 7 is that the information transfer period (for example, the first period, 60 Hz) of the touch-screen display 210 and the resampling period (for example, the second period, 120 Hz) of the processor 330 have an integer-multiple relationship (for example, two times) therebetween. When the information transfer period and the resampling period have an integer-multiple relationship therebetween, the number of touch events transferred from the touch-screen display may be maintained the same even though frames are different. For example, the number of touch events (for example, two) transferred from the touch-screen display within the first frame 640 or 740 may be the same as the number of touch events (for example, two) transferred from the touch-screen display within the second frame 650 or 750. Accordingly, the processor 330 may determine resampling data in all frames on the basis of only the interpolation method (FIG. 6) or on the basis of only the extrapolation method (FIG. 7).

Figure 8:
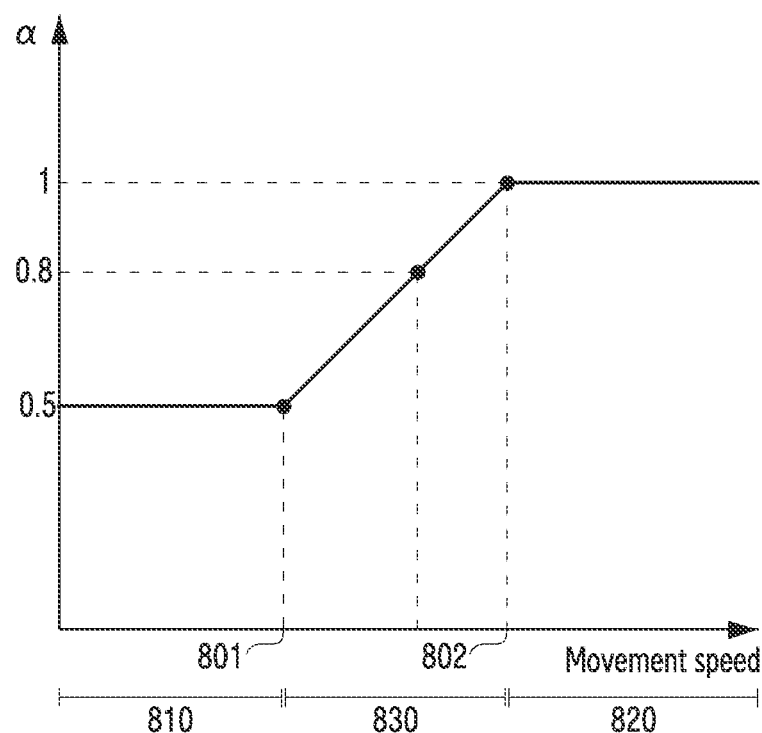
FIG. 8 illustrates a method of determining a resampling time of resampling data on the basis of movement speeds related to touch events according to an embodiment of the disclosure.

FIG. 8 illustrates a method of determining a resampling time of resampling data on the basis of movement speeds related to touch events according to an embodiment of the disclosure.

Referring to FIG. 8, an information transfer period (for example, a first period) of the touch-screen display 210 and a resampling period (for example, a second period) of the processor 330 may have an integer-multiple relationship therebetween. Accordingly, the number of pieces of information on touch events included in a predetermined frame may be maintained to be consistent. For example, the first period may correspond to 60 Hz, and the second period may correspond to 120 Hz. In this case, the number of pieces of information on touch events included in a predetermined frame may be maintained as 2.

FIG. 8 is a two-dimensional graph having movement speeds related to touch events on an x axis and parameters (hereinafter, referred to as alphas) used for determining resampling times on a y axis.

According to an embodiment, an alpha value may be used for determining a resampling time. The alpha value may be designated to a specific frame. For example, the alpha value may include a first alpha value or a second alpha value, the first alpha value may correspond to a first frame, and the second alpha value may correspond to a second frame. According to an embodiment, the alpha value may be a value within a predetermined range. For example, the alpha value may be a value (for example, 0.8) between 0 and 1. An alpha value designated to a specific frame may be determined by default or may be determined on the basis of movement speeds related to touch events included in the specific frame (or the specific frame and a previous frame).

According to an embodiment, the processor 330 may identify movement speeds related to one or more touch events. For example, the processor 330 may identify movement speeds related to touch events on the basis of information on a plurality of touch events received from the touch-screen display 210. The processor 330 may identify movement speeds related to touch events on the basis of an interval of time at which two continuous touch events (for example, a first touch event and a second touch event) are transmitted and a coordinate difference therebetween.

According to an embodiment, the processor 330 may identify whether the movement speed is within a predetermined range. For example, the processor 330 may identify whether the movement speed is included in a low-speed section 810 in which a first movement speed 801 is an upper limit and 0 is a lower limit. In another example, the processor 330 may identify whether the movement speed is included in a high-speed section 820 in which a second movement speed 802 is a lower limit. In another example, the processor 330 may identify whether the movement speed is included in an intermediate-speed section 830 in which the first movement speed 801 is a lower limit and the second movement speed 802 is an upper limit.

According to an embodiment, when the movement speed is within the low-speed range, the processor 330 may determine that the alpha value is a first value (for example, 0.5). When the movement speed is within the high-speed range, the processor 330 may determine that the alpha value is a second value (for example, 1). As long as the movement speed is within the low-speed range, the first value may be determined regardless of the identified movement speed, as may the second value.

According to an embodiment, when the movement speed is within the high-speed range, the processor 330 may determine that the alpha value is a third value (for example, 0.99). For example, the processor 330 may determine that the alpha value is the third value (for example, 0.99), which is similar to but not the same as the second value (for example, 1).

According to an embodiment, when the movement speed is within the intermediate-speed section 830, the processor 330 may determine that the alpha value is the fourth value. The fourth value may be determined in proportion to the identified movement speed. For example, when the first movement speed is 5 and the second movement speed is 10, the fourth value may be 0.8 if the movement speed is identified as 8 and may be 0.9 if the movement speed is identified as 9.

According to an embodiment, the processor 330 may determine a resampling time of a specific frame on the basis of the alpha value. For example, when a first alpha value is configured as 0.5, a resampling time of a first frame (for example, the resampling time 626 of the first resampling data in FIG. 6) may be determined as an intermediate time between a first touch event transfer time included in the first frame (for example, the first touch event transfer time 621 of FIG. 6) and a second touch event transfer time (for example, the second touch event transfer time 622 of FIG. 6). In another example, when the first alpha value is configured as 1, the resampling time of the first frame may be determined as the second touch event transfer time regardless of the first touch event transfer time. In another example, when the first alpha value is configured as a value between 0.5 and 1, the resampling time of the first frame may be configured as a value between the intermediate time (the intermediate time between the first touch event transfer time and the second touch event transfer time) and the second touch event transfer time.

According to an embodiment, the reason why an alpha value designated to a specific frame is determined on the basis of movement speeds related to touch events included in the specific frame is to appropriately handle a trade-off relationship necessarily occurring in resampling logic. If the information transfer period (for example, 120 Hz) transferred from the touch-screen display 210 to the processor 330 is shorter than the resampling period of the processor (for example, 60 Hz), the processor 330 may newly generate resampling data corresponding to a time different from the time at which information on the touch event is transferred from the touch-screen display 210. According to an embodiment, in order to increase reactivity, it is required to generate resampling data by assigning a higher weighted value to the latest information transferred from the touch-screen display 210. However, if the higher weighted value is assigned to the latest transferred information, data variation between resampling data may become larger. Accordingly, in the disclosure, an alpha value designated to a specific frame is determined on the basis of movement speeds related to touch events included in the specific frame in order to handle the trade-off relationship. For example, if the movement speed corresponds to the low-speed section 810, the processor 330 may configure the alpha value to be relatively lower in order to guarantee uniformity between resampling coordinates rather than reactivity. In another example, if the movement speed corresponds to the high-speed section 820, the processor 330 may configure the alpha value to be relatively higher in order to make the user feel faster reactivity rather than uniformity between resampling coordinates.

The alpha value is used to determine a resampling time. The resampling time becomes closer to the first touch event transfer time as the alpha value is smaller, and the resampling time becomes closer to the second touch event transfer time as the alpha value is larger.

Although FIG. 8 illustrates that the alpha value is consistently maintained as a first value in the low-speed section 810 and that the alpha value is consistently maintained as a second value in the high-speed section 820, the alpha values may change proportionally in the low-speed section 810 and the high-speed section 820, like in the intermediate-speed section 830.

According to an embodiment, information on the first to third values may be stored in the memory 310.

Figure 9:
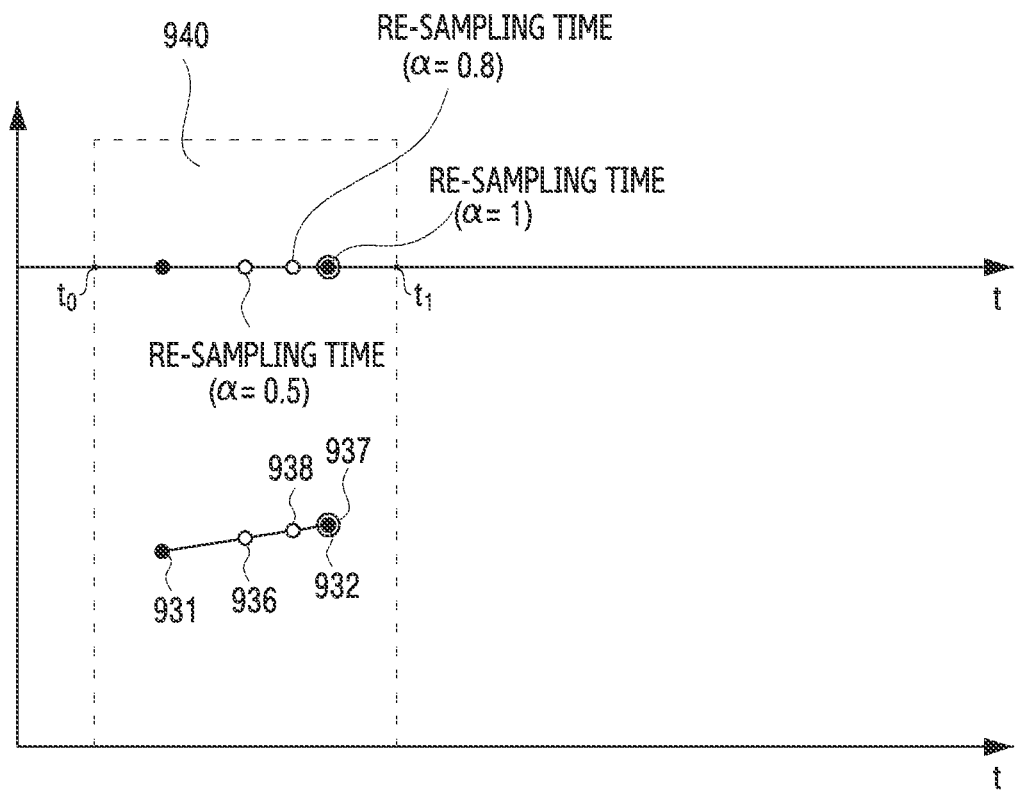
FIG. 9 illustrates a method of determining resampling data on the basis of movement speeds related to touch events according to an embodiment of the disclosure.

FIG. 9 illustrates a method of determining resampling data on the basis of movement speeds related to touch events according to an embodiment of the disclosure.

Referring to FIG. 9, the processor 330 may determine resampling data (for example, coordinates) corresponding to a specific frame on the basis of the determined resampling time. For example, the processor 330 may determine coordinates 936, 937, and 938 corresponding to first resampling data of a first frame 940 by interpolating coordinates 931 corresponding to a first touch event belonging to the first frame 940 and coordinates 932 corresponding to a second touch event at a predetermined ratio. For example, when a first alpha value is determined as 0.5, the processor 330 may determine the coordinates 936 corresponding to the first resampling data by interpolating the coordinates 931 corresponding to the first touch event and the coordinates 932 corresponding to the second touch event at a ratio of 1:1. In another example, when the first alpha value is determined as 0.8, the processor 330 may determine the coordinates 938 corresponding to the first resampling data by interpolating the coordinates 931 corresponding to the first touch event and the coordinates 932 corresponding to the second touch event at a ratio of 4:1. In another example, when the first alpha value is determined as 1, the processor 330 may determine the coordinates 937 corresponding to the first resampling data by interpolating the coordinates 931 corresponding to the first touch event and the coordinates 932 corresponding to the second touch event at a ratio of 1:0.

According to an embodiment, the processor 330 may transfer at least one of the first resampling data and data on the first touch event and/or the second touch event to at least one application installed in the electronic device. For example, the processor 330 may transfer the first resampling data to a first application but may not transfer the data on the first touch event or the second touch event, used to determine the first resampling data, to the first application. In another example, the processor 330 may transfer the first resampling data and the data on the first touch event and the second touch event used to determine the first resampling data to a second application.

As illustrated in FIG. 8, the reason why the processor 330 determines the alpha value as the third value (for example, 0.99) similar to the second value (for example, 1) if the movement speed is within the high-speed range is that the data transferred by the processor 330 is different depending on the application. For example, if the first alpha value is determined as the second value (for example, 1), the coordinates of the first resampling data are the same as the coordinates corresponding to the second touch event, so that the second application receiving both the first resampling data and the data on the second touch event may determine that the user stops (for example, holds) movement of the touch input during a time between the resampling time of the first resampling data and the second touch event transfer time. Accordingly, the processor 330 may configure the first alpha value as the third value (for example, 0.99) similar to but different from the second value (for example, 1), acquire the first resampling data on the basis of the third value, and transfer the acquired first resampling data to the second application along with the data on the first and second touch events. In the case in which the data on the first and second touch events is not transmitted (for example, in the case of the first application), the processor 330 may acquire the first resampling data on the basis of the first alpha value configured as the first value (for example, 1) and transfer the acquired first resampling data to the application.

Figure 10:
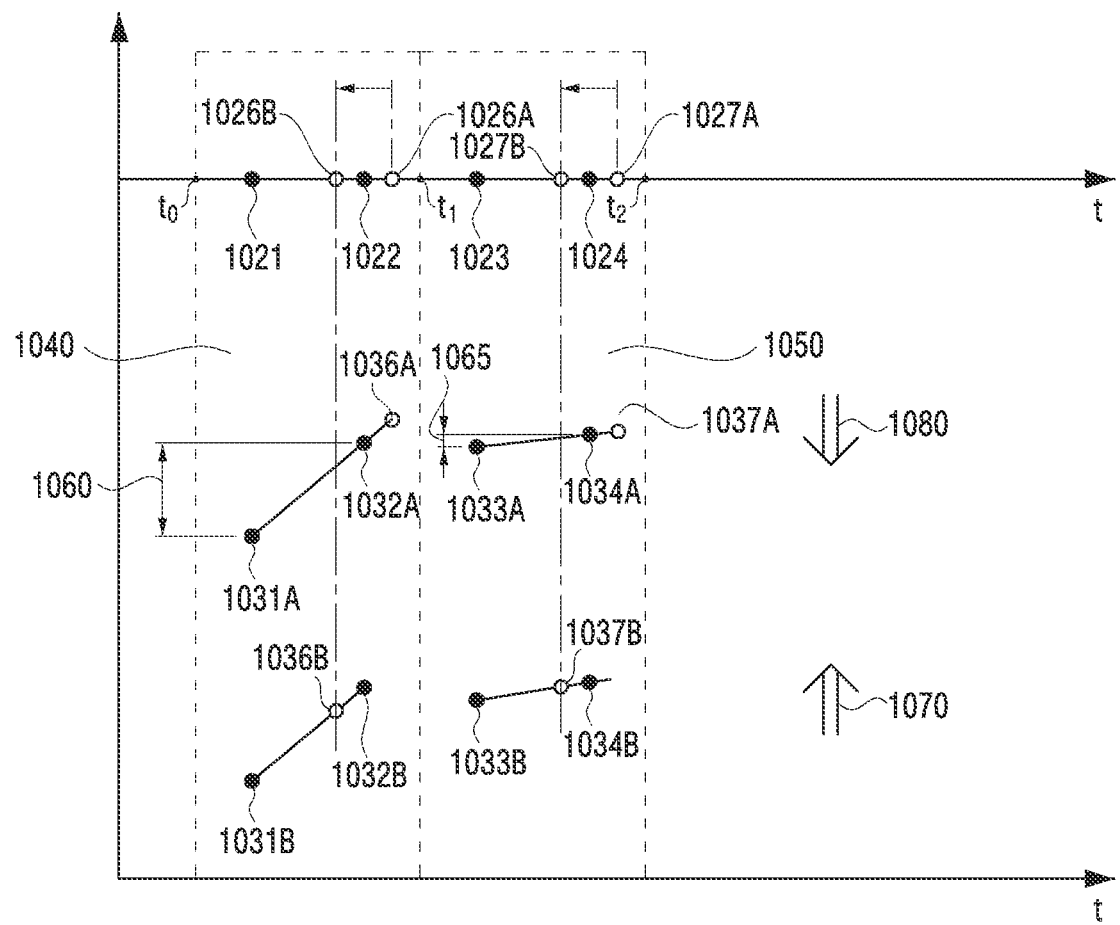
FIG. 10 illustrates an embodiment for changing a method of acquiring resampling data by controlling a resampling time if the information transfer period and the resampling period have an integer-multiple relationship therebetween according to an embodiment of the disclosure.

FIG. 10 illustrates an embodiment for changing a method of acquiring resampling data by controlling a resampling time if the information transfer period and the resampling period have an integer-multiple relationship therebetween according to an embodiment of the disclosure.

Referring to FIG. 10, a first touch event transfer time 1021, a second touch event transfer time 1022, an original time 1023, and a delayed time 1024 may be received in a first frame 1040 and a second frame 1050. The information transfer period (for example, a first period) of the touch-screen display 210 may correspond to 120 Hz and the resampling period (for example, a second period) of the processor 330 may correspond to 60 Hz, and thus the two periods may have an integer-multiple relationship therebetween. Accordingly, respective frames may correspond to a predetermined number of touch events (for example, two). For example, a first frame 1040 corresponds to a first touch event and a second touch event, and a second frame 1050 may correspond to a third touch event and a fourth touch event. Further, resampling data may be determined for each frame. For example, the processor 330 may determine first resampling data corresponding to the first frame 1040 and second resampling data corresponding to the second frame 1050. A method of determining resampling data for each frame may be the same (for example, extrapolation). For example, the processor 330 may determine coordinates 1036A corresponding to first resampling data by extrapolating coordinates 1031A corresponding to the first touch event included in the first frame 1040 and coordinates 1032A corresponding to the second touch event at a predetermined ratio. The predetermined ratio may be determined according to a first resampling time 1026A or a first alpha value corresponding to the first frame. Similarly, the processor 330 may determine coordinates 1037A corresponding to second resampling data by extrapolating coordinates 1033A corresponding to the third touch event included in the second frame 1040 and coordinates 1034A corresponding to the fourth touch event at a predetermined ratio.

Referring to FIG. 10, a movement speed of a user touch input may be relatively higher in the first frame 1040 than in the second frame 1050. It may be noted that a change 1060 on the coordinate axis in the first frame 1040 is larger than a change 1065 on the coordinate axis in the second frame 1050. As described above, if consecutive low-speed touch inputs are made after a high-speed touch input, the processor 300 may recognize a direction different from the direction intended by the user as a touch direction (overshooting phenomenon). From the trend of the coordinates 1031A corresponding to the first touch event, the coordinates 1032A corresponding to the second touch event, the coordinates 1033A corresponding to the third touch event, and the coordinates 1034A corresponding to the fourth touch event, it may be noted that the user performs a touch input at a relatively high speed and then performs a touch input at a relatively low speed. For example, the user rapidly drags in an x-axis direction and then holds the touch input without removing a user's finger from the screen. In this case, the direction intended by the user is the x-axis direction, but the processor 330 may recognize a direction opposite the x-axis direction intended by the user as the touch direction. The processor 330 may recognize that the user performs the touch input in a direction 1080 opposite the x-axis direction from the trend of the coordinates 1036A of the first resampling data of the first frame 1040 and the coordinates 1037A of the second resampling data of the second frame 1050.

The fundamental reason why the above-described error occurs is that the first resampling data (coordinates) and/or the second resampling data (coordinates) are determined on the basis of the extrapolation method. Unlike the interpolation method, the extrapolation method newly generates virtual coordinates out of the coordinates actually transferred from the touch-screen display 210, and accordingly, if the user's touch input rapidly moves and then suddenly stops, the processor 330 may recognize a direction different from the direction intended by the user.

In order to correct the error, the processor 330 may change the first resampling time (or the first alpha value) of the first resampling data of the first frame 1040 and/or the second resampling time (or the second alpha value) of the second resampling data of the second frame 1050. For example, the processor 330 may change the first resampling time of the first resampling data (1026A→1026B) and change the second resampling time of the second resampling data (1027A→1027B). For example, if the movement speed of the user touch input satisfies a predetermined condition, the processor 300 may change the resampling times such that the coordinates of the first resampling data and the second resampling data are determined on the basis of the interpolation method rather than the extrapolation method. For example, if the movement speed of the user touch input in the first frame 1040 is larger than or equal to a predetermined first value and the movement speed of the user touch input in the second frame 1050 is equal to or smaller than a predetermined second value, the processor 330 may change the resampling times such that the coordinates of the first resampling data and the second resampling data are determined on the basis of the interpolation method rather than the extrapolation method.

After changing the resampling times, the processor 330 may determine the coordinates 1036B of the first resampling data and the coordinates 1037B of the second resampling data on the basis of the changed resampling times. For example, the processor 330 may determine the coordinates 1036B of the first resampling data by interpolating the coordinates 1031B corresponding to the first touch event and the coordinates 1032B corresponding to the second touch event at a first ratio. The first ratio may be determined according to the first resampling time 1026B. The processor 330 may determine the coordinates 1037B of the second resampling data by interpolating the coordinates 1033B corresponding to the third touch event and the coordinates 1034B corresponding to the fourth touch event at a second ratio. The second ratio may be determined according to the second resampling time 1027B. The processor 330 may recognize that the user performs the touch input in the x-axis direction 1070 from the trend of the changed coordinates 1036B of the first resampling data and the changed coordinates 1037B of the second resampling data.

Figure 11:
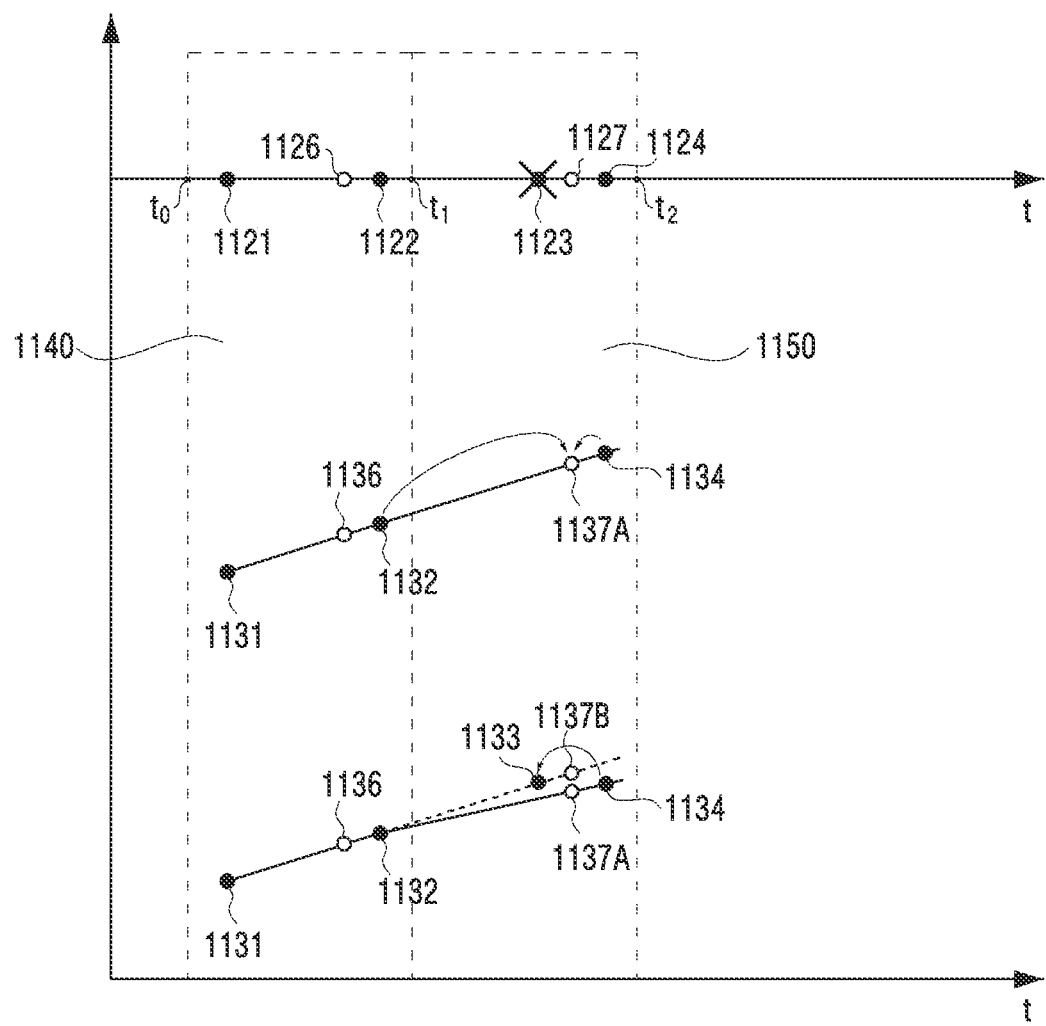
FIG. 11 illustrates an embodiment of acquiring resampling data in response to delayed information transmission when the information transfer period and the resampling period do not have an integer-multiple relationship therebetween according to an embodiment of the disclosure.

FIG. 11 illustrates an embodiment of acquiring resampling data in response to delayed information transmission when the information transfer period and the resampling period do not have an integer-multiple relationship therebetween according to an embodiment of the disclosure.

Referring to FIG. 11, a first touch event transfer time 1121, a second touch event transfer time 1122, an original third event touch transfer time 1123, and a delayed third event touch transfer time 1124 are illustrated within in a first frame 1140 and a second frame 1150. The information transfer period (for example, a first period including resampling time 1126) of the touch-screen display 210 may correspond to 90 Hz and the resampling period (for example, a second period including resampling time 1127) of the processor 330 may correspond to 60 Hz, and thus the two periods may not have an integer-multiple relationship therebetween. Accordingly, respective frames may correspond to different numbers of touch events. For example, a first frame 1140 may correspond to two touch events (for example, a first touch event and a second touch event), and a second frame 1150 may correspond to one touch event (for example, a third touch event). The processor 330 may determine resampling data for each frame on the basis of the interpolation or extrapolation method. For example, the processor 330 may determine the coordinates 1136 of first resampling data of the first frame 1140 on the basis of the interpolation method and also the coordinates 1137A of second resampling data of the second frame 1150 on the basis of the interpolation method.

Referring to FIG. 5, having a condition similar to that of FIG. 11, the processor 330 determines the coordinates 536 of the first resampling data on the basis of the interpolation method and the coordinates 537 of the second resampling data on the basis of the extrapolation method. For example, according to the embodiment of FIG. 5, the processor 330 alternately uses the interpolation method and the extrapolation method to determine the coordinates of the resampling data. On the other hand, the reason why the coordinates 1136 of the first resampling data and the coordinates 1137A of the second resampling data are determined on the basis of the interpolation method is that information corresponding to the third touch event (for example, coordinates 1134 corresponding to the third touch event) is transmitted with a delay (1123→1124). As described above, when information on the touch event is transferred with a delay from the touch-screen display 210 to the processor 330, the resampling data may be acquired on the basis of a method (for example, interpolation method) different from the method (for example, extrapolation method) that should be originally used.

Accordingly, the processor 330 may correct the delay time in order to prevent the error and acquire more accurate resampling data. Hereinafter, a detailed operation and description will be provided.

The processor 330 may identify that coordinate information corresponding to the third touch event is not received at an original third touch event transfer time 1123. The processor 330 may identify the original third touch event transfer time 1123 on the basis of the information transfer period of the touch screen and the second touch event transfer time 1122 and identify that coordinate information corresponding to the third touch event is received at the identified original third touch event transfer time 1123.

The processor 330 may identify that the coordinate information corresponding to the third touch event is received at the delayed third event touch transfer time 1124. The processor 330 may identify delay coordinates 1134 corresponding to the third touch event received at the delayed third event touch transfer time 1124.

According to an embodiment, the processor 330 may determine corrected coordinates 1133 corresponding to the third touch event after coordinates 1131 and 1132. The processor 330 may determine the corrected coordinates 1133 corresponding to the third touch event by making the same coordinates as the delay coordinates 1134 corresponding to the third touch event correspond to the original third touch event transfer time 1123.

The processor 330 may determine corrected second resampling data 1137B on the basis of the corrected coordinates 1133 corresponding to the third touch event. The processor 330 may determine the corrected second resampling data 1137B by extrapolating the coordinates 1132 corresponding to the second touch event and the corrected coordinates 1133 corresponding to the third touch event at a predetermined ratio. It may be noted that the second resampling data 1137A before correction and the second resampling data 1137B after correction are distinguished from each other.

Figure 12:
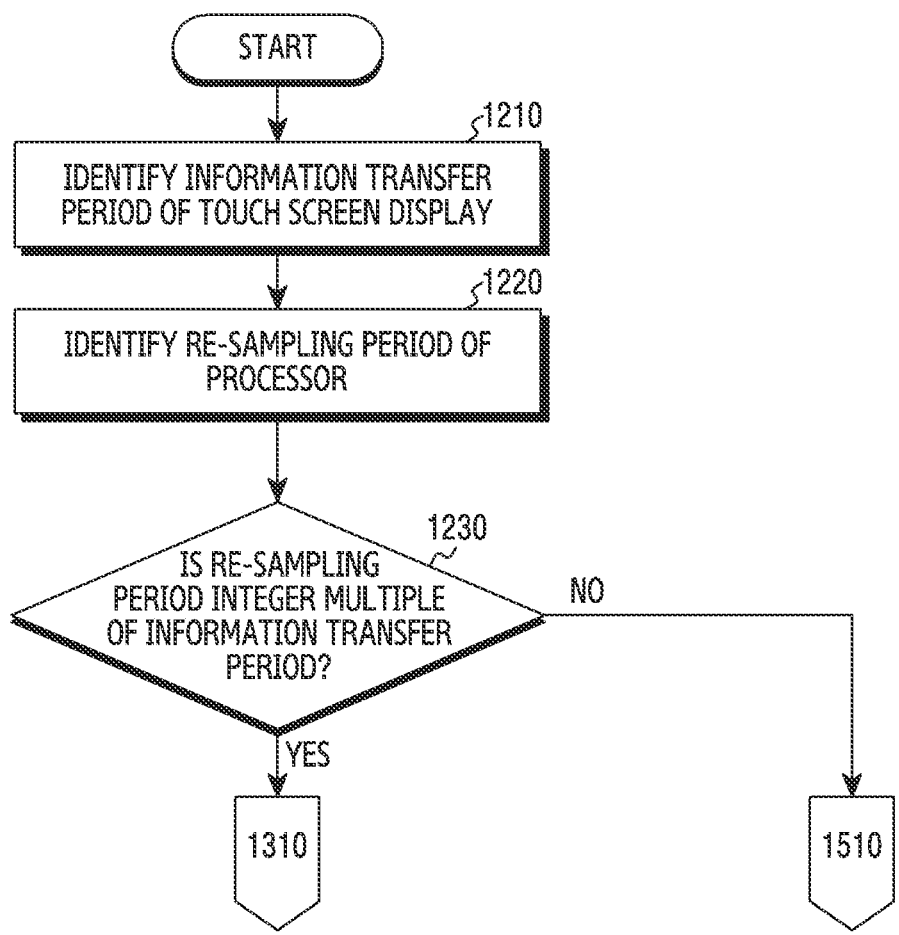
FIG. 12 illustrates an operation order in which the electronic device performs a resampling operation on the basis of data received from the touch-screen display according to an embodiment of the disclosure.

FIG. 12 illustrates an operation in which the electronic device performs a resampling operation on the basis of data received from the touch-screen display according to an embodiment of the disclosure.

The operations illustrated in FIG. 12 may be performed by the electronic device 101 or the processor 330 of the electronic device. Hereinafter, it is described that the operations illustrated in FIG. 12 are performed by the processor 330.

Referring to FIG. 12, in operation 1210, the processor 330 may identify an information transfer period of the touch-screen display 210. For example, the processor 330 may identify whether data on touch events is transferred from the touch-screen display 210 to the processor 330 according to a predetermined period. If the data on the touch events is transmitted according to a predetermined period, the processor 330 may identify the period in which the data on the touch events are transmitted.

According to an embodiment, the processor 330 may identify whether a transfer period (report rate) supported by the TSP IC 440 is explicitly recognized.

In another example, if the report rate supported by the TSP IC 440 is not explicitly identified, the processor 330 may identify the time at which information on one or more touch events is transferred to the processor 330 and thus identify whether the data on the touch events is transferred to the processor 330 according to a predetermined period. For example, it may be identified whether the data on the touch events is transferred to the processor 330 according to a predetermined period by identifying intervals between a first touch event transfer time, a second touch event transfer time, and a third touch event transfer time.

If the report rate supported by the TSP IC 440 is explicitly identified, or even if the report rate supported by the TSP IC 440 is not explicitly identified, when it is determined that the data on the touch events is transferred to the processor 330 according to a predetermined period, the processor 330 may identify a resampling period of the processor 330 in operation 1220.

In operation 1230, the processor 330 may identify whether the resampling period of the processor 330 and the information transfer period of the touch-screen display 210 have an integer-multiple relationship therebetween.

If the resampling period of the processor 330 and the information transfer period of the touch-screen display 210 have an integer-multiple relationship therebetween, the processor 330 may perform operation 1310. For example, the processor 330 may perform the operations illustrated in FIG. 13.

If the resampling period of the processor 330 and the information transfer period of the touch-screen display 210 do not have an integer-multiple relationship therebetween, the processor 330 may perform operation 1510. For example, the processor 330 may perform the operations illustrated in FIG. 15.

Figure 13:
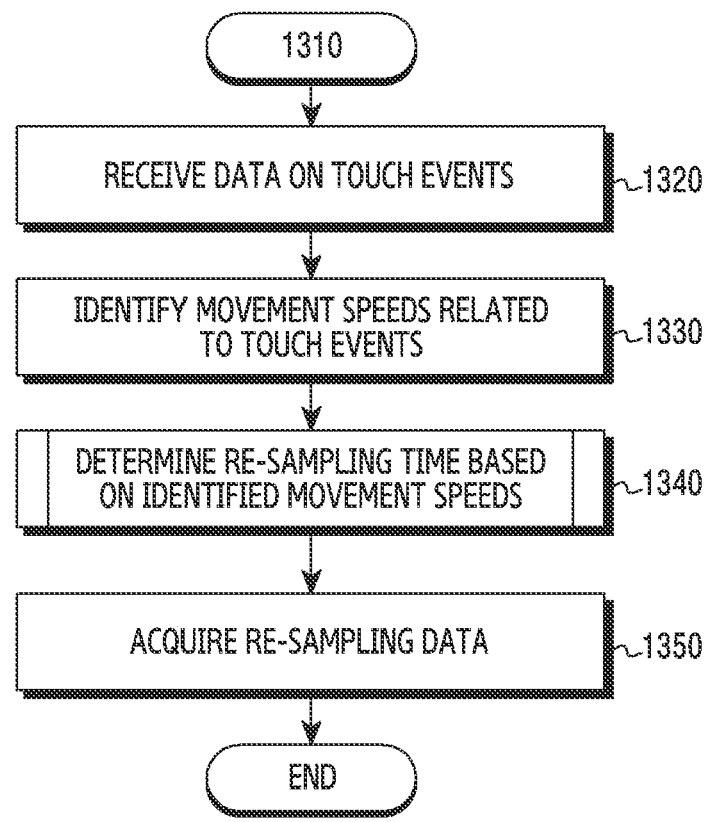
FIG. 13 illustrates an operation order in which the electronic device performs a resampling operation on the basis of data received from the touch-screen display according to an embodiment of the disclosure.

FIG. 13 illustrates an operation in which the electronic device performs a resampling operation on the basis of data received from the touch-screen display according to an embodiment of the disclosure.

Since the operations illustrated in FIG. 13 are performed when the resampling period of the processor 330 and the information transfer period of the touch-screen display 210 have an integer-multiple relationship therebetween, the number (for example, two) of touch events transferred from the touch-screen display 210 to the processor 330 may be maintained the same in a predetermined frame.

Referring to FIG. 13, in operation 1320, the processor 330 may receive data on touch events. For example, the processor 330 may receive data on one or more touch events (for example, a first touch event and a second touch event) from the touch-screen display 210 according to a first period. According to an embodiment, the processor 330 may receive data on one or more touch events (for example, the first touch event and the second touch event) belonging to a first frame and data on one or more touch events (for example, a third touch event and a fourth touch event) belonging to a second frame.

In operation 1330, the processor 330 may identify movement speeds related to the touch events. For example, the processor 330 may identify movement speeds related to touch events on the basis of an interval of times at which two consecutive touch events (for example, the first touch event and the second touch event) are transmitted and a coordinate difference therebetween. The processor 330 may identify a movement speed corresponding to a specific frame.

In operation 1340, the processor 330 may determine a resampling time on the basis of the identified movement speed. For example, if the movement speed corresponds to a low-speed section, an alpha value may be configured to be relatively lower (for example, 0.5) in order to guarantee uniformity between resampling coordinates, and the resampling time may be determined on the basis of the alpha value. In another example, if the movement speed corresponds to a high-speed section, the alpha value may be configured to be relatively higher (for example, 1) in order to make the user feel faster reactivity and the resampling time may be determined on the basis of the alpha value. The processor 330 may determine a resampling time corresponding to a specific frame. For example, the processor 330 may determine a first resampling time corresponding to the first frame.

In operation 1350, the processor 330 may acquire resampling data. The processor 330 may acquire resampling data corresponding to a specific frame. For example, the processor 330 may acquire first resampling data corresponding to the first frame and/or second resampling data corresponding to the second frame. The processor 330 may acquire resampling data corresponding to a specific frame on the basis of a resampling time corresponding to the specific frame. For example, the processor 330 may acquire first resampling data corresponding to the first frame on the basis of a resampling time corresponding to the first frame.

According to an embodiment, the processor 330 may acquire resampling data for all frames through the same method. For example, the processor 330 may acquire first resampling data for the first frame through the extrapolation method, acquire second resampling data for the second frame also through the extrapolation method, and acquire resampling data corresponding to the extrapolation method for the remaining frames.

Figure 14:
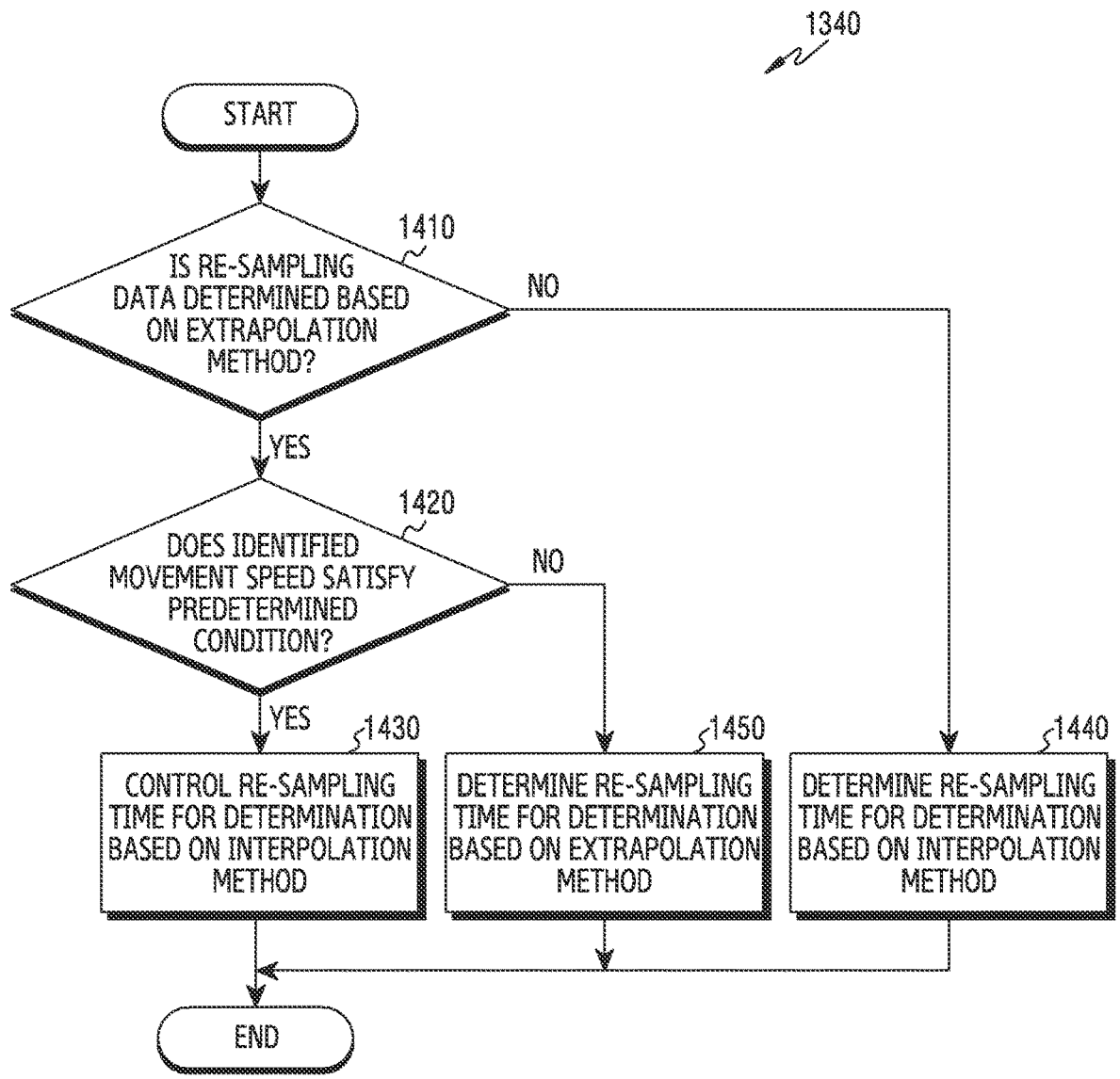
FIG. 14 illustrates an operation order in which the electronic device performs a resampling operation on the basis of data received from the touch-screen display according to an embodiment of the disclosure.

FIG. 14 illustrates an operation in which the electronic device performs a resampling operation on the basis of data received from the touch-screen display according to an embodiment of the disclosure.

The operations illustrated in FIG. 14 are detailed operations of operation 1340 of FIG. 13.

Referring to FIG. 14, in operation 1410, the processor 330 may determine whether resampling data is determined on the basis of the extrapolation method. For example, for the first frame, the second frame, and the remaining frames, the processor 330 may determine whether resampling data is determined on the basis of the extrapolation method.

If the resampling data is not determined on the basis of the extrapolation method, the processor 330 may determine a resampling time such that the resampling data is determined on the basis of the interpolation method in operation 1440. For example, referring to FIG. 6, the processor 330 may determine that the resampling time 627 of the second resampling data is a time between the third touch event transfer time 623 and the fourth touch event transfer time 624.

In operation 1420, the processor 330 may identify whether the identified movement speed satisfies a predetermined condition. For example, the processor may identify whether the movement speed corresponding to the first frame is larger than or equal to a stored first value and whether the movement speed corresponding to the second frame is equal to or smaller than a stored second value.

If the identified movement speed does not satisfy the predetermined condition, the processor 330 may determine a resampling time such that the resampling data is determined on the basis of the extrapolation method in operation 1450. For example, referring to FIG. 7, the processor 330 may determine that the resampling time 727 of the second resampling data is a time between the third touch event transfer time 723 and the fourth touch event transfer time 724.

In operation 1430, the processor 330 may control the resampling time such that the resampling data is determined on the basis of the interpolation method. The processor 330 may change the resampling time such that the determination is made on the basis of the interpolation method rather than the extrapolation method. For example, referring to FIG. 10, the processor 330 may change the resampling time of the second resampling data (1027A→1027B) for the determination based on the interpolation method. The processor 330 may control the resampling time on the basis of the identified movement speed. The processor 330 may control the resampling time on the basis of a difference between the movement speed corresponding to the first frame and the movement speed corresponding to the second frame.

Figure 15:
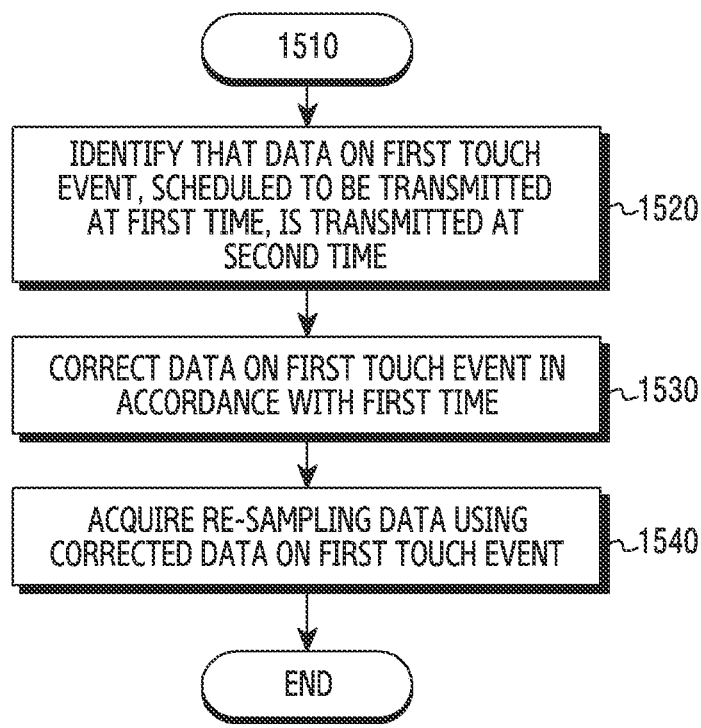
FIG. 15 illustrates an operation order in which the electronic device performs a resampling operation on the basis of data received from the touch-screen display according to an embodiment of the disclosure.

FIG. 15 illustrates an operation in which the electronic device performs a resampling operation on the basis of data received from the touch-screen display according to an embodiment of the disclosure.

Since the operations illustrated in FIG. 15 are performed when the resampling period of the processor 330 and the information transfer period of the touch-screen display 210 do not have an integer-multiple relationship therebetween, the number of touch events transferred from the touch-screen display 210 to the processor 330 in a specific frame (for example, two) may be different from the number of touch events transferred from the touch-screen display 210 to the processor 330 in another frame (for example, one).

Referring to FIG. 15, in operation 1520, the processor 330 may identify that data (for example, coordinates) on a touch event (for example, the third touch event), which is scheduled to be transmitted at a first time point, is transmitted at a second time point. For example, the processor 330 may identify that the data on the coordinates 1134 of the third touch event is transmitted at the delayed third event touch transfer time 1124, rather than the original third event touch transfer time 1123, in FIG. 11.

In operation 1530, the processor 330 may correct data on the touch event in accordance with the first time point. For example, the processor 330 may determine the corrected coordinates 1133 corresponding to the third touch event. For example, the corrected coordinates 1133 corresponding to the third touch event may be the same as the delayed coordinates 1134 corresponding to the third touch event. The corrected coordinates 1133 corresponding to the third touch event may correspond to the original third event touch transfer time 1123.

In operation 1540, the processor 330 may acquire resampling data on the basis of corrected data on the touch event. For example, the processor 330 may determine the second resampling data 1137B on the basis of the corrected coordinates 1133 corresponding to the third touch event and the coordinates 1132 corresponding to the second touch event in FIG. 11.

In a method of operating an electronic device (for example, the electronic device 101) including a touch-screen display (for example, the touch-screen display 210) and a processor (for example, the processor 330) according to various embodiments of the disclosure, the touch-screen display may be configured to transfer data on one or more touch events to the processor on the basis of a first period (for example, the first period 610), and the processor may be configured to acquire resampling data on the basis of a second period (for example, the second period 620), which is an integer multiple of the first period, using the received data. The method may include an operation of identifying movement speeds related to the touch events using the received data, an operation of determining a resampling time (for example, the resampling time 626) at which the resampling data is acquired based on the identified movement speeds, and an operation of acquiring the resampling data based on the determined resampling time.

According to various embodiments, the touch events may include a first touch event and a second touch event, generated later than the first touch event, and the data on the touch events may include data on coordinates and times at which the first touch event and the second touch event are generated.

According to various embodiments, the resampling time may be included in a time section having a predetermined length (for example, the first frame 640), to which the time at which the data on the first touch event is transmitted (for example, the first touch event transfer time 621) and the time at which the data on the second touch event is transmitted (for example, the second touch event transfer time 622) belong, and the resampling data may function as data representing the time section.

According to various embodiments, the operation of acquiring the resampling data may include an operation of interpolating or extrapolating the coordinates at which the first touch event is generated (for example, the coordinates 631 corresponding to the first touch event) and the coordinates at which the second touch event is generated (for example, the coordinates 632 corresponding to the second touch event) in accordance with the resampling time.

According to various embodiments, the operation of determining the resampling time may include an operation of determining that the resampling time is the time at which the second touch event is transmitted when the identified movement speed is within a first range and an operation of determining that the resampling time is an intermediate time between the time at which the first touch event is transmitted and the time at which the second touch event is transmitted when the identified movement speed is within a second range.

According to various embodiments, the operation of determining the resampling time may include an operation of, when the identified movement speed is within a third range, determining that the resampling time is a time located between the time at which the first touch event is transmitted and the time at which the second touch event is transmitted, and a relative position of the determined time between the time at which the first touch event is transmitted and the time at which the second touch event is transmitted corresponds to a relative position of the identified movement speed in the third range.

According to various embodiments, the operation of determining the resampling time may include an operation of, when the identified movement speed satisfies a predetermined condition while the resampling data is acquired by repeatedly performing only an extrapolation operation, controlling the resampling time such that the resampling data is acquired based on an interpolation method.

According to various embodiments, the movement speed may include a first movement speed corresponding to a first time section and a second movement speed corresponding to a second time section after the first time section, and in the predetermined condition, the first movement speed may be larger than or equal to a predetermined first value and the second movement speed may be equal to or smaller than a predetermined second value.

In a method of operating an electronic device (for example, the electronic device 101) including a touch-screen display (for example, the touch-screen display 210) and a processor (for example, the processor 330) according to various embodiments of the disclosure, the touch-screen display may be configured to transfer data on one or more touch events to the processor on the basis of a first period (for example, the first period 510), and the processor may be configured to acquire resampling data on the basis of a second period (for example, the second period 520), which is not an integer multiple of the first period, using the received data. The method may include an operation of identifying that data on a first touch event, scheduled to be transmitted at a first time (for example, the original third touch event transfer time 1123), is transmitted at a second time (for example, the delayed third event touch transfer time 1124), an operation of correcting the data on the first touch event in accordance with the first time, and an operation of acquiring the resampling data using the corrected data on the first touch event.

According to various embodiments, the operation of acquiring the resampling data using the corrected data on the first touch event may include an operation of acquiring the resampling data by interpolating or extrapolating coordinates corresponding to the corrected first touch event and coordinates at which the second touch event is generated, and the second touch event may be a touch event transferred to the processor at a time earlier than the first time.

The computer-readable storage medium may include a hard disk, a floppy disk, a magnetic medium (e.g., a magnetic tape), an Optical Media (e.g., CD-ROM, Digital Versatile Disc (DVD)), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a processor; and
a touch-screen display configured to transfer data to the processor, the data comprising one or more touch events based on a first period,
wherein the processor is configured to:
identify that a relationship between a second period and the first period is one of a first type relationship or a second type relationship, the second period being related to a resampling period of the processor,
based on identifying that the relationship between the second period and the first period is the first type relationship, determine to identify movement speeds of the one or more touch events,
determine a resampling time based on the movement speeds during the second period, the second period being determined based on the first period and the movement speeds, and
resample the data based on the resampling time, and
wherein the processor is further configured to:
based on identifying that the relationship between the second period and the first period is the second type relationship, determine to not identify the movement speeds of the one or more touch events.

2. The electronic device of claim 1,
wherein the processor is further configured to:
based on the second period being an integer multiple of the first period, determine to identify the movement speeds of the one or more touch events, and
wherein the first type relationship is the second period being the integer multiple of the first period.

3. The electronic device of claim 1,
wherein the processor is further configured to:
based on the second period not being an integer multiple of the first period, determine to not identify the movement speeds of the one or more touch events, and
wherein the second type relationship is the second period not being the integer multiple of the first period.

4. The electronic device of claim 1, wherein the processor is further configured to:
based on the second period being an integer multiple of the first period, determine to identify the movement speeds of the one or more touch events,
identify the movement speeds of the one more touch events, based on an interval of time at which each of the touch events is transmitted and a coordinate difference between each of the touch events in a predetermined frame,
identify whether the movement speeds is within a predetermined range, in the predetermined frame,
determine an alpha value corresponding to the predetermined range, and
determine the resampling time of the predetermined frame based on the alpha value and the movement speeds during the second period.

5. The electronic device of claim 1,
wherein the one or more touch events comprise a first touch event and a second touch event generated after the first touch event, and
wherein the data further comprises coordinates and times at which the first touch event and the second touch event are generated, respectively.

6. The electronic device of claim 5,
wherein the resampling time is included in a time period having a predetermined length based on a time at which data of the first touch event is transmitted and a time at which data of the second touch event is transmitted, and
wherein resampling of the data functions as data representing the time period.

7. The electronic device of claim 5, wherein, when resampling the data, the processor is further configured to:
interpolate or extrapolate the coordinates at which the first touch event is generated and the coordinates at which the second touch event is generated.

8. The electronic device of claim 5, wherein, when determining the resampling time, the processor is further configured to:
based on the movement speeds being within a first range, determine that the resampling time corresponds to a time at which the second touch event is transmitted, and
based on the movement speeds being within a second range different from the first range, determine that the resampling time is between a time at which the first touch event is transmitted and the time at which the second touch event is transmitted.

9. The electronic device of claim 8,
wherein the processor is further configured to:
based on the movement speeds being within a third range different from the first and second ranges, determine that the resampling time is between the time at which the first touch event is transmitted and the time at which the second touch event is transmitted, and
wherein a relative position of the resampling time corresponds to a relative position of the movement speeds in the third range.

10. The electronic device of claim 7, wherein the processor is further configured to:
in response to the movement speeds satisfying a predetermined condition while the resampled data is acquired based on extrapolation, control the resampling time such that the resampled data is acquired based on an interpolation.

11. The electronic device of claim 10,
wherein the movement speeds comprise a first movement speed corresponding to a first time period and a second movement speed corresponding to a second time period after the first time period, and
wherein the predetermined condition corresponds to the first movement speed being equal to or greater than a predetermined first value and the second movement speed being equal to or less than a predetermined second value.

* * * * *